US011154839B2

(12) United States Patent
Collias et al.

(10) Patent No.: US 11,154,839 B2
(45) Date of Patent: Oct. 26, 2021

(54) RECYCLING OF SUPERABSORBENT POLYMER VIA UV IRRADIATION IN FLOW SYSTEM

(71) Applicant: The Procter & Gamble Company, Cincinnati, OH (US)

(72) Inventors: Dimitris Ioannis Collias, Mason, OH (US); John Andrew McDaniel, West Chester, OH (US); Gary Wayne Gilbertson, Liberty Township, OH (US); Martin Ian James, Hamilton, OH (US); Arsen Arsenov Simonyan, Schwalbach (DE)

(73) Assignee: The Procter & Gamble Company, Cincinnati, OH (US)

( * ) Notice: Subject to any disclaimer, the term of this patent is extended or adjusted under 35 U.S.C. 154(b) by 327 days.

(21) Appl. No.: 16/548,873

(22) Filed: Aug. 23, 2019

(65) Prior Publication Data
US 2021/0053028 A1   Feb. 25, 2021

(51) Int. Cl.
*B01J 20/34* (2006.01)
*B01J 20/26* (2006.01)
*C08L 33/02* (2006.01)
*C08J 11/16* (2006.01)

(52) U.S. Cl.
CPC ......... *B01J 20/3441* (2013.01); *B01J 20/261* (2013.01); *C08L 33/02* (2013.01); *B01J 2220/68* (2013.01); *C08J 11/16* (2013.01)

(58) Field of Classification Search
CPC ...... B01J 20/34; B01J 20/3441; B01J 20/261; B01J 2220/68; C08L 33/02; C08J 11/16
USPC .......................................................... 502/22
See application file for complete search history.

(56) References Cited

U.S. PATENT DOCUMENTS

| 6,143,820 | A  | 11/2000 | Klier |
| 8,383,746 | B2 | 2/2013 | Torii |
| 8,517,595 | B2 | 8/2013 | Morrison, Jr. |
| 9,095,853 | B2 | 8/2015 | Somma |
| 9,156,034 | B2 | 10/2015 | Somma |
| 9,822,203 | B2 | 11/2017 | Haag |
| 2011/0210469 | A1 | 9/2011 | Keller |
| 2021/0054163 | A1 | 2/2021 | Collias et al. |
| 2021/0054164 | A1 | 2/2021 | Banaszak Holl et al. |

FOREIGN PATENT DOCUMENTS

JP   H09249711 A   9/1997

OTHER PUBLICATIONS

Caruso et al., "Mechanically-Induced Chemical Chages in Polymeric Materials", Chem. Rev. 2009, 109, pp. 5755-5798.

Kaczmarek et al., "Photo-oxidative degradation of some water-soluable polymers in the presence of accelerating agents", Die Angewandte Makromolekulare Chemie 261/262, 1998, pp. 109-121.

Li et al., "Ultraviolet-Induced Decomposition of Acrylic Acid-Based Superabsorbent Hydrogels Crosslinked with N,N-zmethylenebisacrylamide", Department of Chemistry and Chemical Engineering, Zhongkai University,Guangzhou, CN, Aug. 10, 2007, 7 pages.

McNeill et al., Thermal Stability and Degradation Mechanisms of Poly(Acrylic Acid and its Salts: Part 1—Poly(Acrylic Acid), Polymer Degradation and Stability, 29 (1990), pp. 233-246.

Mierzwa et al., "UV-Hydrogen Peroxide Processes", Advanced Oxidation Processes for Wastewater Treatment, Chapter 2, University of Sao Paulo, Sao Paulo SP Brazil, 36 pgs.

Prajapat et al., "Intensification of depolymerization of polyacrylic acid solution using different approaches based on ultrasound and solar irradiation with intensification studies", Ultrasonics Sonochemistry 32, 2016, pp. 290-299.

Shukla et al., "Photo, Thermal and Ultrasonic Degradation of EGDMA-Crosslinked Poly(acrylic acid-co-sodium acrylate-co-acrylamide) Superabsorbents", Journal of Applied Polymer Science DOI 10.1002, Dept. of Chemical Engineering, Indian Institute of Science, 2011, pp. 630-639.

Basedow et al., "Ultrasonic Degradation of Polymers in Solution", Advances in Polymer Science, vol. 22, 1977, pp. 83-148.

Dubinsky et al., "Thermal Degradation of poly(acrylic acid) Containing Copper Nitrate", Polymer Degradation and Stability, vol. 86, 2004, pp. 171-178.

Ebrahim et al., "The Study of Ultrasonic Degradation of Superabsorbent Hydrogels", vol. 2012, Article ID 343768, 05 pages.

Gurkaynak et al., "High-Temperature Degradation of Polyacrylic Acid in Aqueous Solution", Journal of Polymer Science Part A: Polymer Chemistry, vol. 34, 1996, pp. 349-355.

Le'pine et al., "Thermal Degradation of Polyacrylic Acid in Dilute Aqueous Solution", Polymer Degradation and Stability, vol. 75, 2002, pp. 337-345.

McGaugh et al., "The Thermal Degradation of Poly(Acrylic Acid)", Polymer Letters, vol. 5, 1967, pp. 817-820.

McNeill et al., "Thermal Stability and Degradation Mechanisms of Poly(Acrylic Acid) and its Salts: Part 2—Sodium and Potassium Salts", Polymer Degradation and Stability, vol. 30, 1990, pp. 213-230.

McNeill et al., "Thermal Stability and Degradation Mechanisms of Poly(Acrylic Acid) and its Salts: Part 3—Magnesium and Calcium Salts", Polymer Degradation and Stability, vol. 30, 1990, pp. 267-282.

Shukla et al., "Ultrasonic Degradation of Poly(acrylic acid)", Journal of Applied Polymer Science, vol. 112, 2009, pp. 991-997.

Linden et al., "Photooxidative degradation of polymers by HO and HO2 radicals generated during the photolysis of H2O2, FeCl3, and Fenton reagents", Coordination Chemistry Reviews. 125 (1193) pp. 195-217.

Saita et al., "Degradation of Sodium-Polyacrylate in Dilute Aqueous Solution II", Japanese Journal of Applied Physics, vol. 22, No. 8, Aug. 1983. pp. 1310-1314.

(Continued)

*Primary Examiner* — Edward M Johnson
(74) *Attorney, Agent, or Firm* — James E Oehlenschlager

(57) ABSTRACT

Poly(acrylic acid)-based superabsorbent polymer (SAP) in a feed stream is converted with UV irradiation into poly (acrylic acid) (PAA) in a flow system. The UV total energy used to convert SAP into PAA is less than about 50 MJ/kg SAP.

21 Claims, 4 Drawing Sheets

(56) References Cited

OTHER PUBLICATIONS

Shukla et al., "Oxidative and photooxidative degradation of poly(acrylic acid)", Polymer Degradation and Stability, 94, 2009, pp. 1238-1244.
All Office Actions, U.S. Appl. No. 16/999,139.
All Office Actions, U.S. Appl. No. 16/999,127.

RECYCLING OF SUPERABSORBENT POLYMER VIA UV IRRADIATION IN FLOW SYSTEM

FIELD OF THE INVENTION

The present invention generally relates to recycling of poly(acrylic acid)-based superabsorbent polymer (SAP) using UV irradiation in a flow system and at short residence times. More specifically, a feed stream comprising SAP is fed into the flow system and a product stream is produced, which comprises essentially poly(acrylic acid) (PAA). The concentration of SAP in the feed stream is greater than about 1 wt %, and the UV total energy used to convert SAP to PAA is less than about 50 MJ/kg SAP.

BACKGROUND OF THE INVENTION

Recycling of absorbent hygiene products (AHPs) (i.e., baby diapers, feminine protection pads, and adult incontinence pads) is good for the environment and needed to achieve the sustainability goals of many consumer companies. These goals are about using 100% recycled materials and having zero consumer and manufacturing waste go to landfill. In addition to these goals, successful recycling benefits the environment, stimulates the economy, improves people's health and water quality, and generates energy needed by consumers in developing regions of the world.

The major component in AHPs is typically the superabsorbent polymer (SAP), whereas other components are adhesives, cellulose fibers, polyethylene, polypropylene, and polyester. SAP is a water-absorbing, water-swellable, and water-insoluble powdered solid which is a crosslinked and partially neutralized homopolymer of glacial acrylic acid. SAP has an exceptionally high ability to absorb aqueous liquids, such as contaminated water or urine. About 97% of SAP produced today is used in AHP applications, whereas the remainder about 3% is used in other applications, such as agricultural or horticultural water-retaining agents, and industrial waterproofing agents.

Recycling of AHPs involves cleaning of the AHPs from the soils accumulated during their use and separating the various components into recycled material streams. More specifically, the recycled SAP material stream can be used in applications less demanding than AHPs (since the recycled SAP has inferior properties compared to virgin SAP; for example, agricultural or horticultural water-retaining agents, and industrial waterproofing agents) and/or can be converted to essentially non-crosslinked, and slightly branched or linear poly(acrylic acid) (PAA). Then, this PAA can be used as a feed material to various applications. For example, the PAA can be: 1) used as-is in applications such as water treatment or corrosion inhibition; or 2) esterified and then used in adhesives, coatings, etc.; or 3) re-polymerized and re-crosslinked back to SAP; or 4) blended with virgin SAP. The first two sets of applications are part of the effort to recycle SAP into other products by replacing virgin acrylic-acid-based compounds with compounds derived from recycled SAP, whereas the last two sets of applications are part of the circular economy of SAP, i.e., recycling SAP back to SAP. In all cases, the objective is to achieve the same properties as virgin materials.

Non-limiting examples of processes that produce purified and separated material streams of used SAP from recycled AHPs are disclosed and claimed in U.S. Pat. No. 9,095,853 B2, issued on Aug. 4, 2015; and 9,156,034 B2, issued on Oct. 13, 2015; both assigned to Fater S.p.A, based in Pescara, Italy.

Most SAPs are based on poly(acrylic acid) and are crosslinked network materials. Non-limiting examples of procedures used to produce SAPs from glacial acrylic acid and crosslinkers are disclosed in U.S. Pat. No. 8,383,746 B2, issued on Feb. 26, 2013, and assigned to Nippon Shokubai Co., Ltd, based in Osaka, Japan; and U.S. Pat. No. 9,822,203 B2, issued on Nov. 21, 2017, and assigned to BASF SE, based in Ludwigshafen, Germany.

There are many references on attempts to degrade or de-polymerize linear polymers and only a few references on efforts to depolymerize SAPs. The typical forms of energy used in these efforts (either as single forms of energy or in combination) are ultrasonic, UV, mechanical (i.e., in the presence of extensional/elongational forces; examples are: Caruso, M. M., et al., *Chem. Rev.,* 109 (2009), 5755-5798), thermal (example: McNeill, I. C., and Sadeghi, S. M., *Polymer Degrad. Stability,* 29 (1990), 233-246), and microwave. UV is exclusively used with a free-radical generating agent, such as hydrogen peroxide ($H_2O_2$). Examples of using UV and hydrogen peroxide are described in Kaczmarek, H., et al., *Die Angew. Makrom. Chemie,* 261/262 (1998), 109-121, and Mierzwa, J. C., and Rodrigues, R., *Adv. Oxidation Proc. Wastewater Treatm, Chapter* 2 (2018), 13-48. An example of using ultrasound, UV, and $H_2O_2$, is described in Prajapat, A. L., and Gogate, P. R., *Ultrasonics Sonochemistry,* 32 (2016), 290-299. The main themes from all these references on the degradation or de-polymerization of linear polymers are that the preferential scission is at the mid-point of the polymer chain, the higher molecular weight chains are degraded at a higher rate than the lower molecular weight chains, and there is a minimum molecular weight below which degradation or de-polymerization does not occur.

More recently, Li, X., and Cui, Y., *J. Appl. Polym. Sci.,* 108 (2008), 3435-3441; and Shukla, N. B., and Madras, G., J. Appl. Polym. Sci., 125 (2011), 630-639, have attempted to degrade poly(acrylic acid)-based SAP using UV irradiation in static systems. In the first work, the crosslinker was N,N-Methylenebisacrylamide (NMBA) and in the second work it was ethylene glycol dimethacrylate (EGDMA). Weight loss, swelling capacity, and residual weight fraction are the three parameters used to follow the degradation progress over the irradiation time. The time scale of UV irradiation required to achieve zero swelling capacity, or zero residual weight fraction was reported to be about 120 min, which is not commercially viable. At a fixed temperature, close to room temperature (e.g., 30° C.), UV irradiation power higher than 1500 W does not increase the weight loss any further, whereas, at a higher temperature (e.g., 90° C.), UV irradiation power higher than 1500 W increases the weight loss slowly.

Accordingly, there is a need to recycle AHPs and their major component, which is SAP. For the recycling of SAP, there is a need to degrade recycled SAP into poly(acrylic acid) (PAA), in short time scale; with low energy and power per unit mass of SAP; and at mild conditions, such as room temperature, thus avoiding decarboxylation of the degraded SAP. The requirement for low energy per unit mass of SAP stems from the fact that the recycling of SAP and its degradation to PAA is beneficial only if the energy spent during the converting of SAP to PAA is less than that used to make fossil-derived acrylic acid (petro-AA) from propylene, which is about 50 MJ/kg AA. The PAA produced from recycled SAP can then be incorporated back into virgin SAP (thus increasing its recycled content and supporting the circular economy of SAP) and/or derivatized into materials for other applications, such as, adhesives, coatings, water treatment, fabric care, etc.

SUMMARY OF THE INVENTION

In one embodiment of the present invention, a method for degrading a superabsorbent polymer (SAP) to poly(acrylic acid) (PAA) is presented. The method comprises flowing a feed stream comprising said SAP into a UV irradiation zone, irradiating said feed stream with UV, and producing a product stream comprising said PAA at the end of said irradiation zone; wherein said feed stream comprises said SAP at a concentration greater than about 1 wt %; wherein said feed stream has a residence time in said UV irradiation zone of less than about 120 s; and wherein said UV used to convert SAP to PAA requires a UV total energy of less than about 50 MJ/kg SAP.

In another embodiment of the present invention, a method for degrading a superabsorbent polymer (SAP) to poly(acrylic acid) (PAA) is presented. The method comprises flowing a feed stream comprising said SAP into a UV irradiation zone, irradiating said feed stream with UV, and producing a product stream comprising PAA at the end of said UV irradiation zone; wherein said feed stream comprises water and SAP at a concentration greater than about 1 wt %; wherein said feed stream has a residence time in said UV irradiation zone of less than about 120 s; wherein said UV used to convert SAP to PAA requires a UV total energy of less than about 16 MJ/kg SAP; and wherein said PAA has a weight-average molecular weight less than about 1,000,000 g/mol.

In yet another embodiment of the present invention, a method for degrading a superabsorbent polymer (SAP) to poly(acrylic acid) (PAA) is presented. The method comprises flowing a feed stream comprising said SAP into a UV irradiation zone, irradiating said feed stream with UV, and producing a product stream comprising PAA at the end of said UV irradiation zone; wherein said feed stream comprises water and SAP at a concentration greater than about 5 wt %; wherein said feed stream has a residence time in said UV irradiation zone of less than about 120 s; wherein said UV used to convert SAP to PAA requires a UV total energy of less than about 16 MJ/kg SAP; and wherein said PAA has a weight-average molecular weight less than about 1,000,000 g/mol.

BRIEF DESCRIPTION OF THE DRAWINGS

While the specification concludes with claims particularly pointing out and distinctly claiming the invention, it is believed that the present invention will be better understood from the following description taken in conjunction with the accompanying drawings in which:

DETAILED DESCRIPTION OF THE INVENTION

I Definitions

Figure 1:
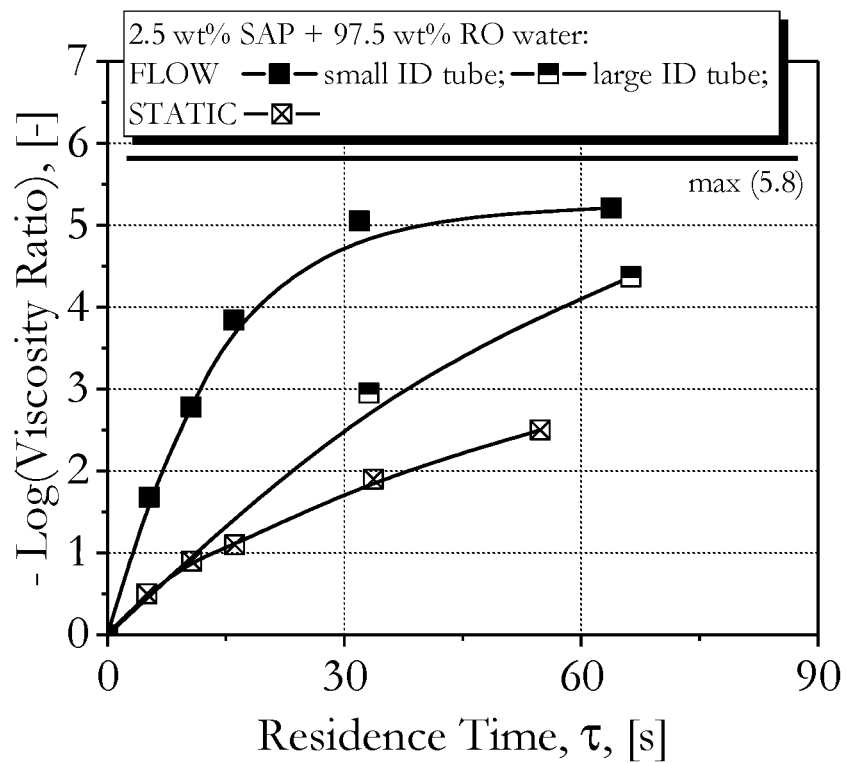
FIG. 1 is a graph showing the negative logarithm of the viscosity ratio between the feed and product streams as a function of the residence time of the feed stream in the irradiation zone of the UV equipment for both a flow system (in two separate tubes with a small and a large ID) and a static system. The curves are for the 2.5 wt % SAP and 97.5 wt % reverse osmosis (RO) water feed stream.

As used herein, the term "SAP" refers to crosslinked, partially neutralized, and poly(acrylic acid)-based superabsorbent polymer. SAP examples are disclosed in U.S. Pat. Nos. 8,383,746 B2 and 9,822,203 B2. Typically, SAP is capable of absorbing a 0.9 wt % saline solution at 25° C. at least 10 times its dry weight. The typical absorption mechanism is osmotic pressure. SAP that absorbs water or aqueous solutions becomes a gel.

As used herein, the term "degree of neutralization" or "DN" refers to the mol percentage of the acid groups in SAP or PAA that are neutralized by the reaction with a base (typically, sodium hydroxide). A typical method to measure the DN of an SAP is to measure the Na content using the Inductively Coupled Plasma (ICP) analytical technique, as it is well known to those skilled in the art. If the amount of Na is wt % (Na), then the degree of neutralization is calculated as DN=100×72/((23×100/wt % (Na))−22).

1 wt % (Na).

As used herein, the term "poly(acrylic acid)" or "PAA" or "polymer of acrylic acid" refers to an essentially non-crosslinked, and either slightly branched or linear poly(acrylic acid) molecule with acrylic acid as the monomeric unit and degree of polymerization that can be 2 or higher. For the purposes of the present invention, there will be no difference between a polymer of acrylic acid and an oligomer of acrylic acid.

As used herein, the term "degradation" refers to the conversion of SAP into PAA via the actions of partial de-polymerization, de-crosslinking, molecular backbone breaking, or any combination of the above actions. For the purposes of the present invention, the terms degradation, recycling, and conversion are used interchangeably, as long as they refer to the transformation of SAP to PAA. Also, the degradation essentially preserves the carboxylic groups of the SAP and thus the product PAA contains those carboxylic groups. Note that full de-polymerization of SAP should lead to acrylic acid (AA).

As used herein, the term "virgin SAP" refers to SAP produced from virgin glacial acrylic acid, which is the feedstock used today to make SAP. Virgin acrylic acid can be produced from either fossil-derived propylene or other bio-derived materials (non-limiting examples of bio-materials are: lactic acid, 3-hydroxypropionic acid, glycerin, bio-propylene, carbon dioxide, and sugar). Virgin SAP does not include any recycled SAP above about 1 wt %.

As used herein, the term "used SAP" refers to SAP which has already been produced industrially and/or used commercially, for example, in a baby diaper, feminine pad, adult incontinence pad, or other articles and/or uses. Used SAP can be post-consumer SAP, post-industrial SAP, or combinations of both. Unless otherwise noted in this invention, SAP refers to either "used SAP" or "virgin SAP".

As used herein, the term "degraded SAP" refers to SAP which has been degraded to PAA. For the purposes of the present invention, the terms "degraded SAP" and "PAA" are used interchangeably.

As used herein, the term "recycled SAP" refers to SAP which contains at least 1 wt % degraded SAP (or equivalently, PAA) that has been incorporated into the SAP while the SAP is being produced from glacial acrylic acid using the typical production method. Thus, the recycled SAP is a blend of virgin SAP and at least 1 wt % degraded SAP.

As used herein, the term "feed stream" refers to a body of fluid that flows in a specific direction and feeds into a flow system.

As used herein, the term "product stream" refers to a body of fluid that is produced from the flow system when the feed stream is fed into it.

As used herein, the term "UV irradiation zone" refers to an area of the flow system that is irradiated by a UV source, for example a Hg lamp. For the purposes of the present invention, UV refers to radiation between 10 nm and 400 nm, that includes the vacuum UV (VUV; 10 nm-200 nm), far UV (FUV; UV C; 200 nm-280 nm), middle UV (MUV; UV B; 280 nm-315 nm), and near UV (NUV; UV A; 315 nm-400 nm) ranges.

As used herein, the term "wall shear stress" refers to the shear stress on the wall of the flow system using the viscosity of the feed stream $\mu$, assuming that there is no slip at the wall. In case the flow system is a circular tube with uniform radius R, the wall shear stress ($\tau_w$) is calculated using the formula:

$$\tau_w = \frac{4\mu \dot{Q}}{\pi R^3},$$

where $\dot{Q}$ is the volumetric flowrate of the feed stream.

As used herein, the terms "viscosity ratio" or "viscosity reduction ratio" refer to the ratio of the viscosity of the product stream to that of the feed stream. The viscosity of the feed stream is typically measured with a parallel plate fixture in oscillatory mode, and the complex viscosity reported typically corresponds to a frequency of 1 rad/s. The viscosity of the product stream is measured with either a cup and bob fixture in steady mode or parallel plate fixture in oscillatory mode. When the viscosity is measured with a cup and bob fixture in steady mode the viscosity reported typically corresponds to a shear rate of 4 $s^{-1}$. These viscosity measurement techniques are well known to those skilled in the art. For the purposes of the present invention, the negative of the logarithm of the viscosity ratio indicates the extent of the SAP degradation to PAA in orders of magnitude, as it is accepted by those skilled in the art that the lower the viscosity of a PAA solution the lower the molecular weight of the PAA is, at a fixed concentration.

As used herein, $M_n$ is the number average molecular weight, in g/mol or equivalently Da, $M_w$ is the weight average molecular weight, in g/mol or equivalently Da, $M_z$ is the z-average molecular weight, in g/mol or equivalently Da, and PDI is the polydispersity index defined as $M_W/M_E$.

As used herein, the term "ply glue" refers to an adhesive that is used to glue 2 or more plies together. For example, a ply glue for paper towel products is used to glue 2 paper plies together thus forming a 2-ply paper towel product.

II Feed Stream

Unexpectedly, it has been found that the UV-based degradation of SAP to PAA (i.e., essentially, without decarboxylation) is much more pronounced when the SAP feed stream flows while being irradiated, compared to when the SAP is static while being irradiated, at the same residence time. Without wishing to be bound by any theory, applicants believe that the stresses generated in the flowing feed stream cause stretching of the bonds and either: 1) lower the UV energy required to degrade SAP to PAA; and/or 2) accelerate the kinetics of the SAP degradation. Also, it was unexpectedly found by the applicants that SAP, which is crosslinked PAA, degrades to a larger degree and faster than PAA, which is slightly branched or linear. Without wishing to be bound by any theory, applicants believe that the degradation of SAP takes place close to the crosslink points between the crosslinker and the AA polymer, and that SAP degradation requires less energy and/or is faster than the degradation of the slightly branched or linear PAA.

Unexpectedly, it has also been found that incorporation of PAA from degraded SAP into virgin SAP results in much less amount of extractables than when the PAA, incorporated into virgin SAP, is commercially available PAA. Without wishing to be bound by any theory, applicants believe that the PAA from the degradation of SAP might be more branched than the commercially available linear PAA, and thus more able to be incorporated into virgin SAP without slipping away from the SAP material during the extractables test.

The typical properties of SAP are mechanical properties, swelling capacity, saline flow conductivity (SFC), absorption against pressure (AAP; INDA test method WSP 242.2), residual monomer, extractable polymer (amount of extractables), and centrifuge retention capacity (CRC). Also, for the purposes of the present invention, the SAP can include other co-monomers, such as itaconic acid, acrylamide, etc., or other materials, such as starch, cellulosic fibers, clays, etc.

SAP is typically prepared using a homogeneous solution polymerization process or by multi-phase polymerization techniques, such as inverse emulsion or suspension polymerization. The polymerization reaction generally occurs in the presence of a relatively small amount of di- or polyfunctional monomers, such as N,N'-methylene bisacrylamide, trimethylolpropane triacrylate, (poly) ethylene glycol di(meth)acrylate, triallylamine, etc. The di- or poly-functional monomer compounds serve to lightly crosslink the acrylate polymer chains, thereby rendering the SAP water-insoluble, yet water-swellable. Furthermore, SAP can be surface-crosslinked after polymerization by reaction with suitable crosslinking agents, such as di/poly-epoxides, di/poly-alcohols, di/poly-haloalkanes, etc. SAP is typically in particulate form, which, in the case of solution polymerization, is produced from a slab of material with any typical size reduction techniques, such as milling.

SAP can be fully un-neutralized (DN=0), fully neutralized (DN=100%), or partly neutralized. In one embodiment of the present invention, the SAP has DN greater than about 50%. In another embodiment of the present invention, the SAP has DN between about 65% and about 75%. In yet another embodiment of the present invention, the SAP has DN greater than about 75%. In even yet another embodiment of the present invention, the SAP has DN lower than about 50%.

In one embodiment of the present invention, the feed stream comprises SAP. In another embodiment of the present invention, the feed stream comprises SAP and water. In yet another embodiment of the present invention, the feed stream comprises SAP and ethylene glycol (EG). In even yet another embodiment of the present invention, the feed stream comprises SAP, water, and ethylene glycol. The water in the feed stream can be RO water, regular tap water, or water containing dissolved inorganic salts at various salt concentrations. A non-limiting example of water with salt is a 0.9 wt % solution of sodium chloride. Other salts with monovalent cations, but higher ionic strength, can be used to reduce the viscosity of the feed stream or alternatively to enable higher SAP concentration to be used. A non-limiting example of a viscosity reducing salt is sodium sulfate.

The feed stream can also comprise any free radical producing chemical compound. Non-limiting examples of such chemical compounds are hydrogen peroxide ($H_2O_2$), persulfate (such as, sodium persulfate or potassium persulfate), perborate, perphosphate, percarbonate, diazo compounds, ozone, organic free radical initiators (e.g. di-ter-butyl peroxide (DTBP)), combinations thereof, etc.

In one embodiment of the present invention, the feed stream comprises SAP and $H_2O_2$. The feed stream can also comprise UV photocatalysts, such as titanium dioxide ($TiO_2$), etc.

In one embodiment of the present invention, the feed stream comprises SAP and $H_2O_2$. In another embodiment of the present invention, the feed stream comprises SAP and a $H_2O_2$ solution. In one embodiment of the present invention, the feed stream comprises SAP at a concentration greater than about 1 wt %. In another embodiment of the present invention, the feed stream comprises SAP at a concentration greater than about 5 wt %. In yet another embodiment of the present invention, the feed stream comprises SAP at a concentration greater than about 10 wt %. In even yet another embodiment of the present invention, the feed stream comprises SAP at a concentration of about 2.5 wt %. In one embodiment of the present invention, the feed stream comprises SAP at a concentration of about 5 wt %.

In one embodiment of the present invention, the feed comprises SAP and a $H_2O_2$ solution, and the concentration of the SAP is about 2.5 wt %, the concentration of the $H_2O_2$ solution is 97.5 wt %, and the concentration of the $H_2O_2$ in the $H_2O_2$ solution is less than about 3 wt %. In another embodiment of the present invention, the feed comprises SAP and a $H_2O_2$, and the concentration of the SAP is about 5 wt %, the concentration of the $H_2O_2$ solution is about 95 wt %, and the concentration of the $H_2O_2$ in the $H_2O_2$ solution is less than about 3 wt %. In yet another embodiment of the present invention, the feed comprises SAP and a $H_2O_2$ solution, and the concentration of the SAP is about 2.5 wt %, the concentration of the $H_2O_2$ solution is 97.5 wt %, and the concentration of the $H_2O_2$ in the $H_2O_2$ solution is about 3 wt %. In another embodiment of the present invention, the feed comprises SAP and a $H_2O_2$, and the concentration of the SAP is about 5 wt %, the concentration of the $H_2O_2$ solution is about 95 wt %, and the concentration of the $H_2O_2$ in the $H_2O_2$ solution is about 3 wt %.

In one embodiment of the present invention, the feed comprises SAP and a $H_2O_2$ solution, and the concentration of the SAP is about 2.5 wt %, the concentration of the $H_2O_2$ solution is 97.5 wt %, and the concentration of the $H_2O_2$ in the $H_2O_2$ solution is about 0.3 wt %. In another embodiment of the present invention, the feed comprises SAP and a $H_2O_2$, and the concentration of the SAP is about 5 wt %, the concentration of the $H_2O_2$ solution is about 95 wt %, and the concentration of the $H_2O_2$ in the $H_2O_2$ solution is about 0.3 wt %. In yet another embodiment of the present invention, the feed comprises SAP and a $H_2O_2$ solution, and the concentration of the SAP is about 2.5 wt %, the concentration of the $H_2O_2$ solution is 97.5 wt %, and the concentration of the $H_2O_2$ in the $H_2O_2$ solution is about 0.03 wt %. In another embodiment of the present invention, the feed comprises SAP and a $H_2O_2$, and the concentration of the SAP is about 5 wt %, the concentration of the $H_2O_2$ solution is about 95 wt %, and the concentration of the $H_2O_2$ in the $H_2O_2$ solution is about 0.03 wt %.

In one embodiment of the present invention, the feed comprises SAP and a $H_2O_2$ solution, and the concentration of the $H_2O_2$ in the $H_2O_2$ solution is less than about 3 wt %. In another embodiment of the present invention, the feed comprises SAP and $H_2O_2$, and the concentration of the $H_2O_2$ in the $H_2O_2$ solution is less than about 0.3 wt %. In yet another embodiment of the present invention, the feed comprises SAP and $H_2O_2$ solution, and the concentration of the $H_2O_2$ in the $H_2O_2$ solution is less than about 0.03 wt %.

The viscosity of the feed stream is typically measured with a parallel plate fixture in oscillatory mode, and the complex viscosity reported typically corresponds to a frequency of 1 rad/s. Depending on the SAP concentration the complex viscosity of the feed stream can be higher than 200 Pa·s (or equivalently, 200,000 cP). The feed stream can be in the form of a solution or gel, depending on the concentration of SAP.

The non-renewable energy use (NREU) to make acrylic acid (AA) from the fossil-derived propylene is estimated to be about 50 MJ/kg SAP (equivalently, 50 MJ/kg AA). Therefore, any successful recycling attempt of SAP needs to expend less energy than the NREU to make AA, i.e., less than about 50 MJ/kg SAP. For the purposes of the NREU, it is assumed that the SAP is fully non-neutralized (DN=0).

III Flow System

Typically, the feed stream is in fluid communication with the flow system via a tube or a channel, and a pump. Non-limiting examples of tubes or channels are glass tubes, metal tubes, alloy tubes (such as, stainless steel tubes), and polymer tubes. The tube or channel can have any cross-sectional shape, such as, circular, rectangular, oval, rhombic, etc. Also, the size of the cross-sectional area of the tube or channel can be the same or vary along the flow direction. A non-limiting example of a varying cross-sectional shape of a tube is an undulating tube that can cause the feed stream to experience extensional stresses as it flows down the tube. These extensional stresses might be beneficial to the degradation of the SAP that is part of the feed stream. Shear stresses can also be beneficial to the degradation of the SAP. Extensional and/or shear stresses can be imparted onto the feed stream by static mixers or other mixing elements placed inside the tube and/or channel that the feed stream flows through.

In one embodiment of the present invention, the wall shear stress $\tau_w$ is at least about 0.1 kPa. In another embodiment of the present invention, the wall shear stress $\tau_w$ is at least about 1 kPa. In yet another embodiment of the present invention, the wall shear stress $\tau_w$ is at least about 5 kPa. In even yet another embodiment of the present invention, the wall shear stress $\tau_w$ is at least about 10 kPa.

Non-limiting examples of pumps are centrifugal pumps (such as, axial, radial, and mixed flow pumps) and positive displacement pumps (such as, reciprocating, rotary, piston, diaphragm, gear, peristaltic, screw, and vane). The flow system can employ one or more pumps.

IV UV Irradiation

The UV irradiation can take place by exposing the flow system to either the sun, or any typical lab or plant UV system, or a combination of both. Typical sources of UV in the lab or plant are LEDs, lasers, gas-discharge lamps, incandescent lamps, etc. The UV radiation degrades SAP into PAA. A typical additional benefit of the UV radiation is its sanitization and sterilization effects on the SAP feed and product streams.

The feed stream gets irradiated by the UV (i.e., gets exposed to the UV radiation) as it flows in the irradiation zone, and it has a residence time in the irradiation zone. In one embodiment of the present invention, the residence time of the feed stream in the UV irradiation zone is less than about 20 min. In another embodiment of the present invention, the residence time of the feed stream in the UV irradiation zone is less than about 10 min. In yet another embodiment of the present invention, the residence time of the feed stream in the UV irradiation zone is less than about 5 min. In one embodiment of the present invention, the residence time of the feed stream in the UV irradiation zone is less than about 120 s. In another embodiment of the present invention, the residence time of the feed stream in the UV irradiation zone is less than about 60 s. In yet another embodiment of the present invention, the residence time of the feed stream in the UV irradiation zone is less than about 30 s. In even yet another embodiment of the present invention, the residence time of the feed stream in the UV irradiation zone is less than about 15 s. In one embodiment of the present invention, the residence time of the feed stream in the UV irradiation zone is less than about 10 s. In another embodiment of the present invention, the residence time of the feed stream in the UV irradiation zone is less than about 5 s.

The UV total energy is the electric energy that is supplied to the UV unit, and the UV irradiation energy (or simply, UV energy) is the UV energy dissipated in the feed stream. The calculations for the UV total energy and UV irradiation energy are exemplified in the Methods section VIII (as they are well known to those skilled in the art).

In one embodiment of the present invention, the UV irradiation energy used to convert SAP to PAA is less than about 30 MJ/kg SAP. In another embodiment of the present invention, the UV irradiation energy used to convert SAP to PAA is less than about 20 MJ/kg SAP. In yet another embodiment of the present invention, the UV irradiation energy used to convert SAP to PAA is less than about 10 MJ/kg SAP. In even yet another embodiment of the present invention, the UV irradiation energy used to convert SAP to PAA is less than about 5 MJ/kg SAP. In one embodiment of the present invention, the UV irradiation energy used to convert SAP to PAA is less than about 1 MJ/kg SAP. In another embodiment of the present invention, the UV irradiation energy used to convert SAP to PAA is less than about 0.5 MJ/kg SAP.

In one embodiment of the present invention, the UV total energy used to convert SAP to PAA is less than about 50 MJ/kg SAP. In another embodiment of the present invention, the UV total energy used to convert SAP to PAA is less than about 32 MJ/kg SAP. In yet another embodiment of the present invention, the UV total energy used to convert SAP to PAA is less than about 16 MJ/kg SAP. In even yet another embodiment of the present invention, the UV total energy used to convert SAP to PAA is less than about 10 MJ/kg SAP. In one embodiment of the present invention, the UV total energy used to convert SAP to PAA is less than about 2 MJ/kg SAP.

The UV irradiation can take place at room temperature or any other temperature. Also, the UV irradiation can take place at atmospheric pressure, in vacuum, or at elevated pressure. Furthermore, the UV irradiation can be preceded or followed by other processes, such as microwave heating, IR heating, ultrasonic irradiation/cavitation, extrusion, extensional stretching, etc.

V Product Stream

The UV irradiation of the feed stream produces a product stream at the end of the irradiation zone. In one embodiment of the present invention, the product stream comprises PAA. In another embodiment of the present invention, the product stream comprises PAA and SAP.

In one embodiment of the present invention, the PAA has a weight-average molecular weight less than about 5,000,000 g/mol. In another embodiment of the present invention, the PAA has a weight-average molecular weight less than about 2,000,000 g/mol. In yet another embodiment of the present invention, the PAA has a weight-average molecular weight less than about 1,000,000 g/mol. In even yet another embodiment of the present invention, the PAA has a weight-average molecular weight less than about 500,000 g/mol. In one embodiment of the present invention, the PAA has a weight-average molecular weight less than about 300,000 g/mol. In another embodiment of the present invention, the PAA has a weight-average molecular weight less than about 200,000 g/mol. In yet another embodiment of the present invention, the PAA has a weight-average molecular weight less than about 100,000 g/mol.

In one embodiment of the present invention, the PAA has a weight-average molecular weight between about 1,000,000 g/mol and about 5,000,000 g/mol. In another embodiment of the present invention, the PAA has a weight-average molecular weight between about 500,000 g/mol and about 2,000,000 g/mol. In yet another embodiment of the present invention, the PAA has a weight-average molecular weight between about 100,000 g/mol and about 1,000,000 g/mol. In even yet another embodiment of the present invention, the PAA has a weight-average molecular weight between about 150,000 g/mol and about 500,000 g/mol. In one embodiment of the present invention, the PAA has a weight-average molecular weight between about 90,000 g/mol and about 300,000 g/mol. In another embodiment of the present invention, the PAA has a weight-average molecular weight between about 20,000 g/mol and about 200,000 g/mol. In yet another embodiment of the present invention, the PAA has a weight-average molecular weight between about 10,000 g/mol and about 100,000 g/mol.

In one embodiment of the present invention, the PAA has a polydispersity index (PDI) less than about 10. In another embodiment of the present invention, the PAA has a PDI less than about 6. In yet another embodiment of the present invention, the PAA has a PDI less than about 4. In even yet another embodiment of the present invention, the PAA has a PDI less than about 2. PDI is the ratio of the weight-average molecular weight to the number-average molecular weight, and these molecular weights are measured by GPC (described in the Methods section VIII) as it is known to those skilled in the art.

The viscosity of the product stream is typically measured with either a parallel plate fixture in oscillatory mode or a cup and bob fixture in steady mode. The oscillatory viscosity reported typically corresponds to 1 rad/s, and the steady viscosity reported typically corresponds to a shear rate of 4 $s^{-1}$. Depending on the PAA concentration and molecular weight, the viscosity of the product stream can be as low as 1 mPa·s (or equivalently, 1 cP; i.e., the viscosity of water).

The ratio of the viscosity of the product stream to the viscosity of the feed stream is the viscosity reduction ratio (or simply, viscosity ratio). It indicates the extent of the SAP degradation to PAA by the UV flow system. The negative logarithm of the viscosity ratio measures the orders of magnitude change between the viscosity of the feed stream and the product stream. In one embodiment of the present invention, the feed stream has a viscosity; the product stream has a viscosity; the ratio of the viscosity of the product stream to the viscosity of the feed stream is the viscosity ratio; and the negative logarithm of said viscosity ratio is less than about 6. In another embodiment of the present invention, the feed stream has a viscosity; the product stream has a viscosity; the ratio of the viscosity of the product stream to the viscosity of the feed stream is the viscosity ratio; and the negative logarithm of said viscosity ratio is less than about 4. In yet another embodiment of the present invention, the feed stream has a viscosity; the product stream has a viscosity; the ratio of the viscosity of the product stream to the viscosity of the feed stream is the viscosity ratio; and the negative logarithm of said viscosity ratio is less than about 2.

PAA from the product stream can be derivatized into materials for various applications, such as, adhesives, coatings, water treatment, etc. In one embodiment of the present invention, PAA from the product stream, either as is or derivatized, is used as an adhesive. In yet another embodiment of the present invention, PAA from the product stream, either as is or derivatized, is used in fabric care applications. In even yet another embodiment of the present invention, PAA from the product stream, either as is or derivatized, is used in water treatment applications.

In one embodiment of the present invention, PAA from the product stream is used as a ply glue in paper products. In another embodiment of the present invention, PAA from the product stream is used as a ply glue in paper towel products. In yet another embodiment of the present invention, PAA from the product stream is used as a ply glue in toilet paper products. In even yet another embodiment of the present invention, PAA from the product stream is used as ply glue in paper products has $M_w$ greater than about 350 kDa. In one embodiment of the present invention, PAA from the product stream is used as ply glue in paper products has $M_w$ between about 400 kDa and about 500 kDa.

In another embodiment of the present invention, PAA from the product stream is used as a glue between the paper core and paper towel products. In even another embodiment of the present invention, PAA from the product stream is used as a glue between the paper core and toilet paper products.

PAA can be extracted from the product stream via a number of processes. Non-limiting examples of these processes are water evaporation, PAA filtration, water extraction, etc. Also, salts present in the product stream from the use of SAP in AHPs can be removed via any desalination technique known to those skilled in the art. Non-limiting examples of desalination processes are membrane processes (e.g. reverse osmosis, forward osmosis, electrodialysis reversal (EDR), nanofiltration, etc.), freezing desalination, solar desalination, geothermal desalination, ion exchange, wave powered desalination, etc.

VI Recycled SAP

PAA from the product stream can be fed into the process to make SAP from glacial acrylic acid, thus producing recycled SAP. EXAMPLES 58 and 59 show the incorporation of PAA into virgin SAP. In one embodiment of the present invention, the PAA is used to produce a recycled SAP.

In one embodiment of the present invention, the SAP comprises PAA at a concentration, and wherein the PAA concentration is less than about 60 wt %. In another embodiment of the present invention, the SAP comprises PAA at a concentration, and wherein the PAA concentration is less than about 50 wt %. In yet another embodiment of the present invention, the SAP comprises PAA at a concentration, and wherein the PAA concentration is less than about 45 wt %. In even yet another embodiment of the present invention, the SAP comprises PAA at a concentration, and wherein the PAA concentration is less than about 40 wt %. In one embodiment of the present invention, the SAP comprises PAA at a concentration, and wherein the PAA concentration is less than about 30 wt %. In another embodiment of the present invention, the SAP comprises PAA at a concentration, and wherein the PAA concentration is less than about 20 wt %. In yet another embodiment of the present invention, the SAP comprises PAA at a concentration, and wherein the PAA concentration is less than about 15 wt %. In even yet another embodiment of the present invention, the SAP comprises PAA at a concentration, and wherein the PAA concentration is less than about 10 wt %.

In one embodiment of the present invention, the recycled SAP has an amount of extractables, and wherein the amount of extractables is less than about 20 wt %. In another embodiment of the present invention, the recycled SAP has an amount of extractables, and wherein the amount of extractables is less than about 15 wt %. In yet another embodiment of the present invention, the recycled SAP has an amount of extractables, and wherein the amount of extractables is less than about 10 wt %. In even yet another embodiment of the present invention, the recycled SAP has an amount of extractables, and wherein the amount of extractables is less than about 7 wt %.

In one embodiment of the present invention, the recycled SAP has a swelling ratio, and wherein the swelling ratio is greater than about 50 g/g. In another embodiment of the present invention, the recycled SAP has a swelling ratio, and wherein the swelling ratio is greater than about 45 g/g. In yet another embodiment of the present invention, the recycled SAP has a swelling ratio, and wherein the swelling ratio is greater than about 40 g/g. In even yet another embodiment of the present invention, the recycled SAP has a swelling ratio, and wherein the swelling ratio is greater than about 35 g/g.

In one embodiment of the present invention, the recycled SAP has a swelling ratio, and wherein the swelling ratio is about 50 g/g. In another embodiment of the present invention, the recycled SAP has a swelling ratio, and wherein the swelling ratio is about 45 g/g. In yet another embodiment of the present invention, the recycled SAP has a swelling ratio, and wherein the swelling ratio is about 42 g/g. In even yet another embodiment of the present invention, the recycled SAP has a swelling ratio, and wherein the swelling ratio is about 40 g/g.

In one embodiment of the present invention, the recycled SAP has a CRC, and wherein the CRC is between about 20 g/g and about 45 g/g. In another embodiment of the present invention, the recycled SAP has a CRC, and wherein the CRC is between about 25 g/g and about 40 g/g. In yet another embodiment of the present invention, the recycled SAP has a CRC, and wherein the CRC is between about 30 g/g and about 35 g/g.

In one embodiment of the present invention, the recycled SAP has an AAP, and wherein said AAP is between about 15 g/g and about 40 g/g. In another embodiment of the present invention, the recycled SAP has an AAP, and wherein said AAP is between about 20 g/g and about 35 g/g. In yet another embodiment of the present invention, the recycled SAP has an AAP, and wherein said AAP is between about 25 g/g and about 30 g/g.

VII Examples

Unless otherwise noted, the SAP used in the EXAMPLES below is denoted as "GIC 31187", came from the Procter & Gamble Co. (Cincinnati, Ohio), was prepared according to the procedure described in the Methods section VIII, had particle size between 63 and 150 μm, DN of 68 mol %, and its typical properties are shown in the Methods section VIII.

Inventive EXAMPLES 1 to 5 show that the negative logarithm of the viscosity ratio of the product stream to the feed stream (i.e., orders of magnitude reduction in the product stream viscosity relative to the feed stream viscosity) initially increases with residence time in the UV irradiation zone and then approaches a plateau in a flow system and a feed stream with 2.5 wt % SAP and 97.5 wt % RO water. The results from these inventive EXAMPLES are also shown in TABLE 1 and FIG. 1.

Example 1

Figure 4:
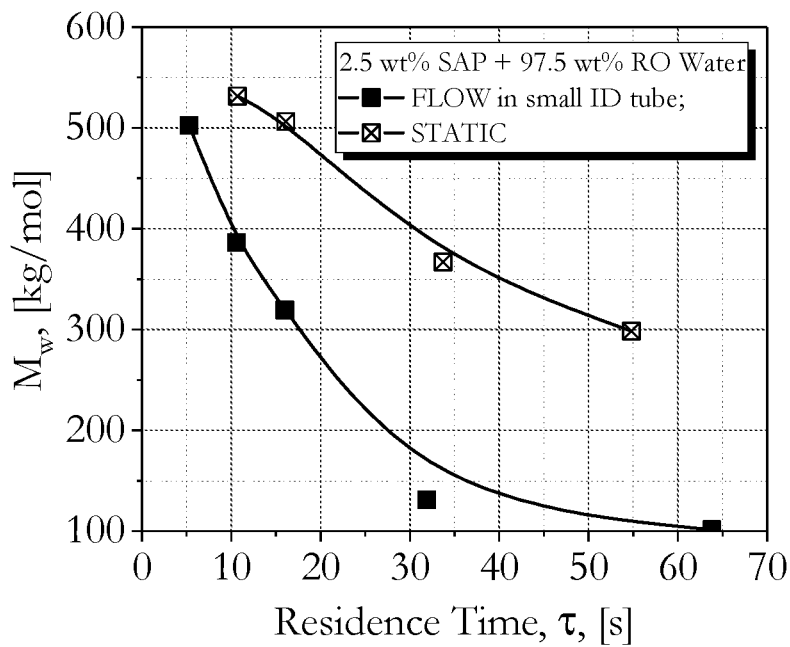
FIG. 4 is a graph showing $M_w$ as a function of the residence time of the feed stream in the irradiation zone of the UV equipment for both a flow system and a static system. The curves are for the 2.5 wt % SAP and 97.5 wt % RO water feed stream.

SAP was mixed with RO water overnight to produce a feed stream (in the form of a gel) with 2.5 wt % SAP and 97.5 wt % RO water. About 60 mL of the feed stream was loaded in a syringe and fed into a Fusion UV Curing system (FUSION UV SYSTEMS, Inc., Maryland, USA; Hg lamp (H-Bulb) with 300 W/in. and 2.74 W/cm$^2$ power measured by the UV PowerMAP® #20082105 A/B/C/V (EIT, Inc.; Sterling, Va.)) in a 6 mm external diameter (OD) (3.68 mm internal diameter (ID)) quartz tube and at a rate of 1.5 mL/min using a syringe pump (New Era Pump Systems, Inc., Farmingdale, N.Y.; model NE-1000 single syringe pump). The UV lamp was set perpendicular to the quartz tube, the length of the quartz tube exposed to the UV irradiation was estimated to be 15 cm, the longitudinal axis of the quartz tube was about 8 mm above the focal point of the UV lamp, and the residence time of the feed stream in the irradiation zone was 63.8 s. At those conditions, the UV irradiation energy was calculated as 5.8 MJ/kg SAP. The product stream was collected at the end of the quartz tube in a beaker. The viscosity of the feed stream was measured with a parallel plate fixture in oscillatory mode and the viscosity of the product stream was measured with a cup and bob fixture in steady mode. The complex viscosity of the feed stream at 1 rad/s was measured as 682.1 Pa·s and the steady viscosity of the product stream at 4 s$^{-1}$ was measured as 4.2 mPa·s. Thus, the wall shear stress was calculated as 3.5 kPa, the viscosity ratio of the two streams was 6.2×10$^{-6}$, and its negative logarithm was 5.2. The product stream was analyzed using the GPC-T technique (see the Molecular Weight Distribution (MWD) Analysis description in the Methods section VIII) in duplicates and yielded the following average values: $M_n$=41,498 Da; $M_w$=101,403 Da; $M_z$=635,680 Da; and PDI=2.44. Note that in a baseline experiment, the viscosity of the product stream coming out of the same quartz tube with the UV lamp not powered on was measured as about 607 Pa·s, which results in a viscosity ratio of about 0.88 and a negative logarithm of the viscosity ratio of about 0.05. PAA in the product stream was not decarboxylated as shown in FIG. 4.

Example 2

The feed stream of EXAMPLE 1 was loaded in the same equipment of EXAMPLE 1 and run at a rate of 3 mL/min, which resulted in residence time in the irradiation zone of 31.9 s, and UV irradiation energy calculated as 2.9 MJ/kg SAP. The viscosity of the product stream was measured with a cup and bob fixture in steady mode, and at 4 s$^{-1}$ it was measured as 6.1 mPa·s. Thus, the wall shear stress was calculated as 7 kPa, the viscosity ratio of the two streams was 8.9×10$^{-6}$, and its negative logarithm was 5. PAA in the product stream was not decarboxylated as shown in FIG. 4. The product stream was analyzed using the GPC-T technique in duplicates and yielded the following average values: $M_n$=58,359 Da; $M_w$=130,922 Da; $M_z$=399,090 Da; and PDI=2.24.

Example 3

The feed stream of EXAMPLE 1 was loaded in the same equipment of EXAMPLE 1 and run at a rate of 6 mL/min, which resulted in residence time in the irradiation zone of 16 s, and UV irradiation energy calculated as 1.4 MJ/kg SAP. The viscosity of the product stream was measured with a cup and bob fixture in steady mode, and at 4 s$^{-1}$ it was measured as 99 mPa·s. Thus, the wall shear stress was calculated as 13.9 kPa, the viscosity ratio of the two streams was 1.5× 10$^{-4}$, and its negative logarithm was 3.8. Note that in a baseline experiment, the viscosity of the product stream coming out of the same quartz tube with the UV lamp not powered on was measured as about 579 Pa·s, which results in a viscosity ratio of about 0.85 and a negative logarithm of the viscosity ratio of about 0.07. PAA in the product stream was not decarboxylated as shown in FIG. 4. The product stream was analyzed using the GPC-T technique in duplicates and yielded the following average values: $M_n$=109,554 Da; $M_w$=319,114 Da; $M_z$=1,212,000 Da; and PDI=2.91.

Example 4

The feed stream of EXAMPLE 1 was loaded in the same equipment of EXAMPLE 1 and run at a rate of 9 mL/min, which resulted in residence time in the irradiation zone of 10.6 s, and UV irradiation energy calculated as 1 MJ/kg SAP. The viscosity of the product stream was measured with a cup and bob fixture in steady mode, and at 4 s$^{-1}$ it was measured as 1.14 Pa·s. Thus, the wall shear stress was calculated as 20.9 kPa, the viscosity ratio of the two streams was $1.7 \times 10^{-3}$, and its negative logarithm was 2.8. PAA in the product stream was not decarboxylated as shown in FIG. 4. The product stream was analyzed using the GPC-T technique in duplicates and yielded the following average values: $M_n$=116,873 Da; $M_w$=386,424 Da; $M_z$=1,716,000 Da; and PDI=3.31.

Example 5

The feed stream of EXAMPLE 1 was loaded in the same equipment of EXAMPLE 1 and run at a rate of 18 mL/min, which resulted in residence time in the irradiation zone of 5.3 s, and UV irradiation energy calculated as 0.5 MJ/kg SAP. The viscosity of the product stream was measured with a parallel plate fixture in oscillatory mode, and at 1 rad/s it was measured as 14.3 Pa·s. Thus, the wall shear stress was calculated as 41.8 kPa, the viscosity ratio of the two streams was $2.1 \times 10^{-2}$, and its negative logarithm was 1.7. PAA in the product stream was not decarboxylated as shown in FIG. 4. The product stream was analyzed using the GPC-T technique in duplicates and yielded the following average values: $M_n$=183,824 Da; $M_w$=502,418 Da; $M_z$=1,487,000 Da; and PDI=2.73.

Inventive EXAMPLES 6 to 9 show that the negative logarithm of the viscosity ratio of the product stream to the feed stream (i.e., orders of magnitude reduction in the product stream viscosity relative to the feed stream viscosity) increases with residence time in the UV irradiation zone without approaching a plateau (up to about 64 s residence time) in a flow system and a feed stream with 5 wt % SAP and 95 wt % RO water. The results from these inventive EXAMPLES are also shown in TABLE 1 and FIG. 5.

Example 6

A feed stream with 5 wt % SAP and 95 wt % RO water was prepared as in EXAMPLE 1. The feed stream was loaded in the same equipment of EXAMPLE 1 and run at a rate of 1.5 mL/min, which resulted in residence time in the irradiation zone of 63.8 s, and UV irradiation energy calculated as 5.8 MJ/kg SAP. The viscosity of the feed stream was measured with a parallel plate fixture in oscillatory mode, and at 1 rad/s it was measured as 1327.1 Pa·s. The viscosity of the product stream was measured with a cup and bob fixture in steady mode, and at 4 s$^{-1}$ it was measured as 35 mPa·s. Thus, the wall shear stress was calculated as 6.8 kPa, the viscosity ratio of the two streams was $2.6 \times 10^{-5}$, and its negative logarithm was 4.6.

Example 7

The feed stream of EXAMPLE 6 was loaded in the same equipment of EXAMPLE 1 and ran at a rate of 3 mL/min, which resulted in residence time in the irradiation zone of 31.9 s, and UV irradiation energy calculated as 2.9 MJ/kg SAP. The viscosity of the product stream was measured with a cup and bob fixture in steady mode, and at 4 s$^{-1}$ it was measured as 0.5 Pa·s. Thus, the wall shear stress was calculated as 13.6 kPa, the viscosity ratio of the two streams was $3.8 \times 10^{-4}$, and its negative logarithm was 3.4.

Example 8

The feed stream of EXAMPLE 6 was loaded in the same equipment of EXAMPLE 1 and run at a rate of 6 mL/min, which resulted in residence time in the irradiation zone of 16 s, and UV irradiation energy calculated as 1.4 MJ/kg SAP. The viscosity of the product stream was measured with a parallel plate fixture in oscillatory mode, and at 1 rad/s it was measured as 53.7 Pa·s. Thus, the wall shear stress was calculated as 27.1 kPa, the viscosity ratio of the two streams was $4 \times 10^{-2}$, and its negative logarithm was 1.4.

Example 9

The feed stream of EXAMPLE 6 was loaded in the same equipment of EXAMPLE 1 and run at a rate of 9 mL/min, which resulted in residence time in the irradiation zone of 10.6 s, and UV irradiation energy calculated as 1 MJ/kg SAP. The viscosity of the product stream was measured with a parallel plate fixture in oscillatory mode, and at 1 rad/s it was measured as 64.1 Pa·s. Thus, the wall shear stress was calculated as 40.7 kPa, the viscosity ratio of the two streams was $4.8 \times 10^{-2}$, and its negative logarithm was 1.3.

Figure 3:
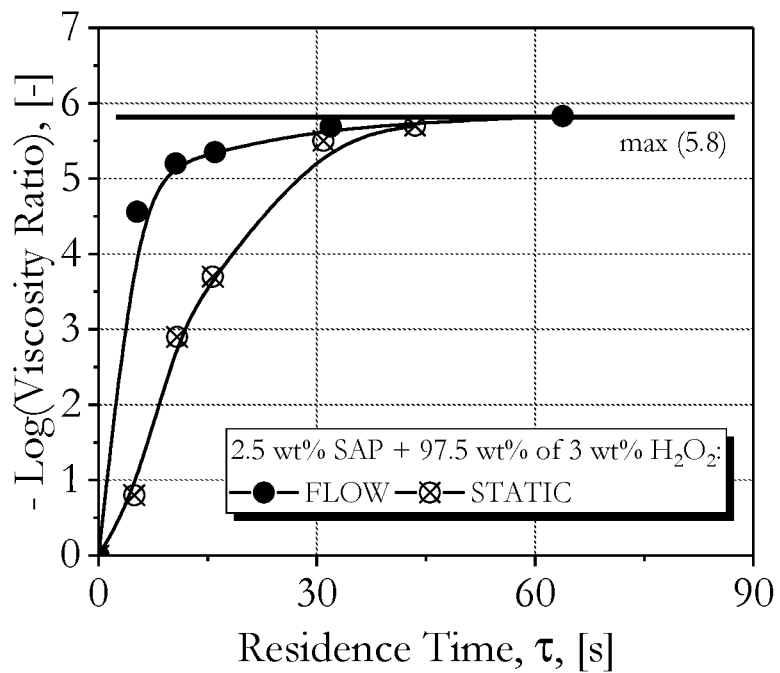
FIG. 3 is a graph showing the negative logarithm of the viscosity ratio between the feed and product streams as a function of the residence time of the feed stream in the irradiation zone of the UV equipment for both a flow system and a static system. The curves are for feed stream with 2.5 wt % SAP and 97.5 wt % of 3 wt % $H_2O_2$ solution.

Inventive EXAMPLES 10 to 14 show that the presence of $H_2O_2$ accelerates the SAP degradation, as evidenced by the higher negative logarithm of the viscosity ratio of the product stream to the feed stream compared to that in the absence of $H_2O_2$ at the same residence time (e.g. EXAMPLES 1 to 5) in a flow system and a feed stream with 2.5 wt % SAP and 97.5 wt % of 3 wt % $H_2O_2$ solution. The results from these inventive EXAMPLES are also shown in TABLE 1 and FIG. 3.

Example 10

A feed stream with 2.5 wt % SAP and 97.5 wt % of a 3 wt % hydrogen peroxide solution was prepared as in EXAMPLE 1. The feed stream was loaded in the same equipment of EXAMPLE 1 and run at a rate of 1.5 mL/min, which resulted in residence time in the irradiation zone of 63.8 s, and UV irradiation energy calculated as 5.8 MJ/kg SAP. The viscosity of the feed stream was measured with a parallel plate fixture in oscillatory mode, and at 1 rad/s it was measured as 612.4 Pa·s. The viscosity of the product stream was measured with a cup and bob fixture in steady mode, and at 4 s$^{-1}$ it was measured as about 1 mPa·s. Thus, the wall shear stress was calculated as 3.1 kPa, the viscosity ratio of the two streams was $1.6 \times 10^{-6}$, and its negative logarithm was 5.8.

Example 11

The feed stream of EXAMPLE 10 was loaded in the same equipment of EXAMPLE 1 and run at a rate of 3 mL/min, which resulted in residence time in the irradiation zone of 31.9 s, and UV irradiation energy calculated as 2.9 MJ/kg SAP. The viscosity of the product stream was measured with a cup and bob fixture in steady mode, and at 4 s$^{-1}$ it was measured as 1.25 mPa·s. Thus, the wall shear stress was calculated as 6.3 kPa, the viscosity ratio of the two streams was $2 \times 10^{-6}$, and its negative logarithm was 5.7.

Example 12

The feed stream of EXAMPLE 10 was loaded in the same equipment of EXAMPLE 1 and run at a rate of 6 mL/min, which resulted in residence time in the irradiation zone of 16 s, and UV irradiation energy calculated as 1.4 MJ/kg SAP. The viscosity of the product stream was measured with a cup and bob fixture in steady mode, and at 4 s$^{-1}$ it was measured as 2.76 mPa·s. Thus, the wall shear stress was calculated as 12.5 kPa, the viscosity ratio of the two streams was 4.5×10$^{-6}$, and its negative logarithm was 5.3.

Example 13

The feed stream of EXAMPLE 10 was loaded in the same equipment of EXAMPLE 1 and run at a rate of 9 mL/min, which resulted in residence time in the irradiation zone of 10.6 s, and UV irradiation energy calculated as 1 MJ/kg SAP. The viscosity of the product stream was measured with a cup and bob fixture in steady mode, and at 4 s$^{-1}$ it was measured as 3.89 mPa·s. Thus, the wall shear stress was calculated as 18.8 kPa, the viscosity ratio of the two streams was 6.4×10$^{-6}$, and its negative logarithm was 5.2.

Example 14

The feed stream of EXAMPLE 10 was loaded in the same equipment of EXAMPLE 1 and run at a rate of 18 mL/min, which resulted in residence time in the irradiation zone of 5.3 s, and UV irradiation energy calculated as 0.5 MJ/kg SAP. The viscosity of the product stream was measured with a cup and bob fixture in steady mode, and at 4 s$^{-1}$ it was measured as 17 mPa·s. Thus, the wall shear stress was calculated as 37.6 kPa, the viscosity ratio of the two streams was 2.8×10$^{-5}$, and its negative logarithm was 4.6.

Inventive EXAMPLES 15 to 18 show that the presence of $H_2O_2$ accelerates the SAP degradation, as evidenced by the higher negative logarithm of the viscosity ratio of the product stream to the feed stream compared to that in the absence of $H_2O_2$ at the same residence time (e.g. EXAMPLES 6 to 9) in a flow system and a feed stream with 5 wt % SAP and 95 wt % of 3 wt % $H_2O_2$ solution. The results from these inventive EXAMPLES are also shown in TABLE 1.

Example 15

A feed stream with 5 wt % SAP and 95 wt % of a 3 wt % hydrogen peroxide solution was prepared as in EXAMPLE 1. The feed stream was loaded in the same equipment of EXAMPLE 1 and run at a rate of 1.5 mL/min, which resulted in residence time in the irradiation zone of 63.8 s, and UV irradiation energy calculated as 5.8 MJ/kg SAP. The viscosity of the feed stream was measured with a parallel plate fixture in oscillatory mode, and at 1 rad/s it was measured as 1437.7 Pa·s. The viscosity of the product stream was measured with a cup and bob fixture in steady mode, and at 4 s$^{-1}$ it was measured as 2.8 mPa·s. Thus, the wall shear stress was calculated as 7.4 kPa, the viscosity ratio of the two streams was 1.9×10$^{-6}$, and its negative logarithm was 5.7.

Example 16

The feed stream of EXAMPLE 15 was loaded in the same equipment of EXAMPLE 1 and run at a rate of 3 mL/min, which resulted in residence time in the irradiation zone of 31.9 s, and UV irradiation energy calculated as 2.9 MJ/kg SAP. The viscosity of the product stream was measured with a cup and bob fixture in steady mode, and at 4 s$^{-1}$ it was measured as 5.36 mPa·s. Thus, the wall shear stress was calculated as 14.7 kPa, the viscosity ratio of the two streams was 3.7×10$^{-6}$, and its negative logarithm was 5.4.

Example 17

The feed stream of EXAMPLE 15 was loaded in the same equipment of EXAMPLE 1 and run at a rate of 6 mL/min, which resulted in residence time in the irradiation zone of 16 s, and UV irradiation energy calculated as 1.4 MJ/kg SAP. The viscosity of the product stream was measured with a cup and bob fixture in steady mode, and at 4 s$^{-1}$ it was measured as 10 mPa·s. Thus, the wall shear stress was calculated as 29.4 kPa, the viscosity ratio of the two streams was 7×10$^{-6}$, and its negative logarithm was 5.2.

Example 18

The feed stream of EXAMPLE 15 was loaded in the same equipment of EXAMPLE 1 and run at a rate of 9 mL/min, which resulted in residence time in the irradiation zone of 10.6 s, and UV irradiation energy calculated as 1 MJ/kg SAP. The viscosity of the product stream was measured with a cup and bob fixture in steady mode, and at 4 s$^{-1}$ it was measured as 28 mPa·s. Thus, the wall shear stress was calculated as 44.1 kPa, the viscosity ratio of the two streams was 1.9×10$^{-5}$, and its negative logarithm was 4.7.

The compositions of the feed streams, experimental conditions, and results from inventive EXAMPLES 1 to 18 are summarized in TABLE 1 below.

TABLE 1

| EXAMPLE # | SAP, [wt %] | RO Water, [wt %] | 3 wt % $H_2O_2$ Solution, [wt %] | Flow Rate, [mL/min] | Residence Time, [s] | UV Irradiation Energy, [MJ/kg] | −LOG (Viscosity Ratio), [−] |
|---|---|---|---|---|---|---|---|
| 1 | 2.5 | 97.5 | | 1.5 | 63.8 | 5.8 | 5.2 |
| 2 | 2.5 | 97.5 | | 3 | 31.9 | 2.9 | 5 |
| 3 | 2.5 | 97.5 | | 6 | 16 | 1.4 | 3.8 |
| 4 | 2.5 | 97.5 | | 9 | 10.6 | 1 | 2.8 |
| 5 | 2.5 | 97.5 | | 18 | 5.3 | 0.5 | 1.7 |
| 6 | 5 | 95 | | 1.5 | 63.8 | 5.8 | 4.6 |
| 7 | 5 | 95 | | 3 | 31.9 | 2.9 | 3.4 |
| 8 | 5 | 95 | | 6 | 16 | 1.4 | 1.4 |
| 9 | 5 | 95 | | 9 | 10.6 | 1 | 1.3 |
| 10 | 2.5 | | 97.5 | 1.5 | 63.8 | 5.8 | 5.8 |
| 11 | 2.5 | | 97.5 | 3 | 31.9 | 2.9 | 5.7 |
| 12 | 2.5 | | 97.5 | 6 | 16 | 1.4 | 5.3 |
| 13 | 2.5 | | 97.5 | 9 | 10.6 | 1 | 5.2 |
| 14 | 2.5 | | 97.5 | 18 | 5.3 | 0.5 | 4.6 |
| 15 | 5 | | 95 | 1.5 | 63.8 | 5.8 | 5.7 |

TABLE 1-continued

| EXAMPLE # | SAP, [wt %] | RO Water, [wt %] | 3 wt % H$_2$O$_2$ Solution, [wt %] | Flow Rate, [mL/min] | Residence Time, [s] | UV Irradiation Energy, [MJ/kg] | −LOG (Viscosity Ratio), [−] |
|---|---|---|---|---|---|---|---|
| 16 | 5 | | 95 | 3 | 31.9 | 2.9 | 5.4 |
| 17 | 5 | | 95 | 6 | 16 | 1.4 | 5.2 |
| 18 | 5 | | 95 | 9 | 10.6 | 1 | 4.7 |

Inventive EXAMPLES 19 to 23 show that replacing part of the water in the feed stream with ethylene glycol has no significant effect (i.e., within 10% difference) on the negative logarithm of the viscosity ratio of the product stream to the feed steam for a flow system and feed stream with 2.5 wt % SAP, 2.5 wt % ethylene glycol, and 95 wt % RO water compared to a corresponding system without ethylene glycol. Results from inventive EXAMPLES 20 to 23 are also shown in TABLE 2.

Example 19

A feed stream with 2.5 wt % SAP, 2.5 wt % ethylene glycol (Sigma-Aldrich, St. Louis, Mo., USA; Part #102466), and 95 wt % RO water was prepared as in EXAMPLE 1. The feed stream was loaded in the same equipment of EXAMPLE 1 and run at a rate of 0.75 mL/min, which resulted in residence time in the irradiation zone of 127.6 s, and UV irradiation energy calculated as 11.6 MJ/kg SAP. The viscosity of the feed stream was measured with a parallel plate fixture in oscillatory mode, and at 1 rad/s it was measured as 687 Pa·s. The viscosity of the product stream was measured with a cup and bob fixture in steady mode, and at 4 s$^{-1}$ it was measured as 5 mPa·s. Thus, the wall shear stress was calculated as 1.8 kPa, the viscosity ratio of the two streams was 7.3×10$^{-6}$, and its negative logarithm was 5.1.

Example 20

The feed stream of EXAMPLE 19 was fed into the UV flow system of EXAMPLE 1 at a rate of 1.5 mL/min, which resulted in residence time in the irradiation zone of 63.8 s, and UV irradiation energy calculated as 5.8 MJ/kg SAP. The viscosity of the product stream was measured with a cup and bob fixture in steady mode, and at 4 s$^{-1}$ it was measured as 13 mPa·s. Thus, the wall shear stress was calculated as 3.5 kPa, the viscosity ratio of the two streams was 1.9×10$^{-5}$, and its negative logarithm was 4.7.

Example 21

The feed stream of EXAMPLE 19 was fed into the UV flow system of EXAMPLE 1 at a rate of 3 mL/min, which resulted in residence time in the irradiation zone of 31.9 s, and UV irradiation energy calculated as 2.9 MJ/kg SAP. The viscosity of the product stream was measured with a cup and bob fixture in steady mode, and at 4 s$^{-1}$ it was measured as 25 mPa·s. Thus, the wall shear stress was calculated as 7 kPa, the viscosity ratio of the two streams was 3.6×10$^{-5}$, and its negative logarithm was 4.4.

Example 22

The feed stream of EXAMPLE 19 was fed into the UV flow system of EXAMPLE 1 at a rate of 9 mL/min, which resulted in residence time in the irradiation zone of 10.6 s, and UV irradiation energy calculated as 1 MJ/kg SAP. The viscosity of the product stream was measured with a cup and bob fixture in steady mode, and at 4 s$^{-1}$ it was measured as 1.82 Pa·s. Thus, the wall shear stress was calculated as 21.1 kPa, the viscosity ratio of the two streams was 2.6×10$^{-3}$, and its negative logarithm was 2.6.

Example 23

The feed stream of EXAMPLE 19 was fed into the UV flow system of EXAMPLE 1 at a rate of 18 mL/min, which resulted in residence time in the irradiation zone of 5.3 s, and UV irradiation energy calculated as 0.5 MJ/kg SAP. The viscosity of the product stream was measured with a parallel plate fixture in oscillatory mode, and at 1 rad/s it was measured as 80.4 Pa·s. Thus, the wall shear stress was calculated as 42.1 kPa, the viscosity ratio of the two streams was 1.2×10$^{-1}$, and its negative logarithm was 0.9.

Inventive EXAMPLES 24 to 26 show that replacing the water in the feed stream with 0.9 wt % saline (to simulate urine) has no effect on the negative logarithm of the viscosity ratio of the product stream to the feed steam for a flow system and feed stream with 2.5 wt % SAP, 2.5 wt % ethylene glycol, and 95 wt % of a 0.9 wt % saline water compared to a corresponding system without the saline water. The results from these inventive EXAMPLES are also shown in TABLE 2.

Example 24

A feed stream with 2.5 wt % SAP, 2.5 wt % ethylene glycol (Sigma-Aldrich, St. Louis, Mo., USA; Part #102466), and 95 wt % of 0.9 wt % saline water (produced by dissolving 9 g of sodium chloride in 1 L of RO water; used to simulate urine from the use of the SAP in an AHP) was prepared as in EXAMPLE 1. The feed stream was loaded in the same equipment of EXAMPLE 1 and run at a rate of 3 mL/min, which resulted in residence time in the irradiation zone of 31.9 s, and UV irradiation energy calculated as 2.9 MJ/kg SAP. The viscosity of the feed stream was measured with a parallel plate fixture in oscillatory mode, and at 1 rad/s it was measured as 433.9 Pa·s. The viscosity of the product stream was measured with a cup and bob fixture in steady mode, and at 4 s$^{-1}$ it was measured as 14 mPa·s. Thus, the wall shear stress was calculated as 4.4 kPa, the viscosity ratio of the two streams was 3.2×10$^{-5}$, and its negative logarithm was 4.5.

Example 25

The feed stream of EXAMPLE 24 was fed into the UV flow system of EXAMPLE 1 at a rate of 9 mL/min, which resulted in residence time in the irradiation zone of 10.6 s, and UV irradiation energy calculated as 1 MJ/kg SAP. The viscosity of the product stream was measured with a cup and bob fixture in steady mode, and at 4 s$^{-1}$ it was measured as 0.65 Pa·s. Thus, the wall shear stress was calculated as 13.3 kPa, the viscosity ratio of the two streams was 1.5×10$^{-3}$, and its negative logarithm was 2.8.

Example 26

The feed stream of EXAMPLE 24 was fed into the UV flow system of EXAMPLE 1 at a rate of 18 mL/min, which resulted in residence time of the feed stream in the irradiation zone of 5.3 s, and UV irradiation energy calculated as 0.5 MJ/kg SAP. The viscosity of the product stream was measured with a parallel plate fixture in oscillatory mode, and at 1 rad/s it was measured as 23.2 Pa·s. Thus, the wall shear stress was calculated as 26.6 kPa, the viscosity ratio of the two streams was 5.3×10$^{-2}$, and its negative logarithm was 1.3.

Inventive EXAMPLES 27 to 29 show that replacing part of the water in the feed stream with ethylene glycol has no significant effect (i.e., within 10% difference) on the negative logarithm of the viscosity ratio of the product stream to the feed steam for a flow system and feed stream with 5 wt % SAP, 5 wt % ethylene glycol, and 90 wt % RO water compared to a corresponding system without ethylene glycol. Results from inventive EXAMPLES 28 and 29 are also shown in TABLE 2.

Example 28

The feed stream of EXAMPLE 27 was fed into the UV flow system of EXAMPLE 1 at a rate of 1.5 mL/min, which resulted in residence time in the irradiation zone of 63.8 s, and UV irradiation energy calculated as 5.8 MJ/kg SAP. The viscosity of the product stream was measured with a cup and bob fixture in steady mode, and at 4 s$^{-1}$ it was measured as 53 mPa·s. Thus, the wall shear stress was calculated as 7.2 kPa, the viscosity ratio of the two streams was 3.8×10$^{-5}$, and its negative logarithm was 4.4.

Example 29

The feed stream of EXAMPLE 27 was fed into the UV flow system of EXAMPLE 1 at a rate of 3 mL/min, which resulted in residence time in the irradiation zone of 31.9 s, and UV irradiation energy calculated as 2.9 MJ/kg SAP. The viscosity of the product stream was measured with a cup and bob fixture in steady mode, and at 4 s$^{-1}$ it was measured as 1.87 Pa·s. Thus, the wall shear stress was calculated as 14.4 kPa, the viscosity ratio of the two streams was 1.3×10$^{-3}$, and its negative logarithm was 2.9.

The compositions of the feed streams, experimental conditions, and results from inventive EXAMPLES 1, 2, 4 to 7, 20 to 26, 28, and 29 are summarized in TABLE 2 below.

TABLE 2

| EXAMPLE # | SAP, [wt %] | RO Water, [wt %] | EG, [wt %] | 0.9 wt % Saline Water, [wt %] | 3 wt % H$_2$O$_2$ Solution, [wt %] | Flow Rate, [mL/min] | −LOG (Viscosity Ratio), [−] |
|---|---|---|---|---|---|---|---|
| 1 | 2.5 | 97.5 | — | — | — | 1.5 | 5.2 |
| 2 | 2.5 | 97.5 | — | — | — | 3 | 5 |
| 4 | 2.5 | 97.5 | — | — | — | 9 | 2.8 |
| 5 | 2.5 | 97.5 | — | — | — | 18 | 1.7 |
| 20 | 2.5 | 95 | 2.5 | — | — | 1.5 | 4.7 |
| 21 | 2.5 | 95 | 2.5 | — | — | 3 | 4.4 |
| 22 | 2.5 | 95 | 2.5 | — | — | 9 | 2.6 |
| 23 | 2.5 | 95 | 2.5 | — | — | 18 | 0.9 |
| 24 | 2.5 | — | 2.5 | 95 | — | 3 | 4.5 |
| 25 | 2.5 | — | 2.5 | 95 | — | 9 | 2.8 |
| 26 | 2.5 | — | 2.5 | 95 | — | 18 | 1.3 |
| 6 | 5 | 95 | — | — | — | 1.5 | 4.6 |
| 7 | 5 | 95 | — | — | — | 3 | 3.4 |
| 28 | 5 | 90 | 5 | — | — | 1.5 | 4.4 |
| 29 | 5 | 90 | 5 | — | — | 3 | 2.9 |

Example 27

A feed stream with 5 wt % SAP, 5 wt % ethylene glycol (Sigma-Aldrich, St. Louis, Mo., USA; Part #102466), and 90 wt % RO water was prepared as in EXAMPLE 1. The feed stream was loaded in the same equipment of EXAMPLE 1 and run at a rate of 0.75 mL/min, which resulted in residence time in the irradiation zone of 127.6 s, and UV irradiation energy calculated as 11.6 MJ/kg SAP. The viscosity of the feed stream was measured with a parallel plate fixture in oscillatory mode, and at 1 rad/s it was measured as 1407 Pa·s. The viscosity of the product stream was measured with a cup and bob fixture in steady mode, and at 4 s$^{-1}$ it was measured as 36 mPa·s. Thus, the wall shear stress was calculated as 3.6 kPa, the viscosity ratio of the two streams was 2.6×10$^{-5}$, and its negative logarithm was 4.6.

Comparative EXAMPLE 30 shows that, surprisingly, in a flow system UV degrades SAP (which is crosslinked PAA; see inventive EXAMPLE 21) much more than PAA (which is slightly branched or linear). The feed stream has 2.5 wt % PAA, 2.5 wt % ethylene glycol, and 95 wt % RO water. The results from this comparative EXAMPLE are also shown in TABLE 3.

Example 30—Comparative

A feed stream with 2.5 wt % poly(acrylic acid) (PAA), with average molecular weight of about 750,000 g/mol (Scientific Polymer Products, Inc., Ontario, N.Y.; Catalog #597), 2.5 wt % ethylene glycol, and 95 wt % RO water was prepared as in EXAMPLE 1. The UV treatment of the feed stream was the same as in EXAMPLE 1. The viscosity of the feed stream was measured with a cup and bob fixture in steady mode, and at 4 s$^{-1}$ it was measured as 16.5 Pa·s. The viscosity of the product stream was measured with a cup and bob fixture, and at 4 s$^{-1}$ it was measured as 108 mPa·s. Thus, the wall shear stress was calculated as 0.1 kPa, viscosity ratio of the two streams was 6.5×10$^{-3}$, and its negative logarithm was 2.2.

Comparative EXAMPLE 31 shows that, surprisingly, in a flow system UV degrades SAP (which is crosslinked PAA; see inventive EXAMPLE 29) much more than PAA (which is slightly branched or linear). The feed stream of comparative EXAMPLE 31 has 5 wt % PAA, 5 wt % ethylene glycol, and 90 wt % RO water. The results from this comparative EXAMPLE are also shown in TABLE 3.

Example 31—Comparative

A feed stream with 5 wt % PAA, 5 wt % ethylene glycol, and 90 wt % RO water was prepared as in EXAMPLE 30. The UV treatment of the feed stream was the same as in EXAMPLE 1. The viscosity of the feed stream was measured with a parallel plate fixture, and at 1 rad/s it was measured as 83.4 Pa·s. The viscosity of the product stream was measured with a parallel plate fixture in steady mode, and at 4 s$^{-1}$ it was measured as 34.2 Pa·s. Thus, the wall shear stress was calculated as 0.4 kPa, the viscosity ratio of the two streams was 4.1×10$^{-1}$, and its negative logarithm was 0.4. PAA in the product stream was not decarboxylated per FTIR spectrum analysis similar to EXAMPLES 1 to 5

Comparative EXAMPLE 32 shows that, surprisingly, in a flow system UV degrades SAP (which is crosslinked PAA; see inventive EXAMPLE 16) much more than PAA (which is slightly branched or linear). The feed stream of comparative EXAMPLE 32 has 5 wt % PAA, 5 wt % ethylene glycol, and 90 wt % of 3 wt % H$_2$O$_2$ solution. The results from this comparative EXAMPLE are also shown in TABLE 3.

Example 32—Comparative

A feed stream with 5 wt % PAA, 5 wt % ethylene glycol, and 90 wt % of 3 wt % H$_2$O$_2$ solution was prepared as in EXAMPLE 30. The UV treatment of the feed stream was the same as in EXAMPLE 1. The complex viscosity of the feed stream was measured with a parallel plate fixture in oscillatory mode, and at 1 rad/s it was measured as 71.4 Pa·s. The viscosity of the product stream was measured with a cup and bob fixture in steady mode, and at 4 s$^{-1}$ it was measured as 32.7 mPa·s. Thus, the wall shear stress was calculated as 0.4 kPa, the viscosity ratio of the two streams was 4.6×10$^{-4}$, and its negative logarithm was 3.3.

Comparative EXAMPLE 33 shows that in a flow system UV degrades SAP (which is crosslinked PAA; see inventive EXAMPLE 29) about the same as PAA (which is slightly branched or linear) if the DN of the PAA is about the same as that of SAP. The feed stream of comparative EXAMPLE 33 has 5 wt % PAA, 5 wt % ethylene glycol, 43.5 wt % RO water, and 46.5 wt % of 1 M NaOH solution. The results from this comparative EXAMPLE are also shown in TABLE 3.

Example 33—Comparative

A feed stream with 5 wt % PAA, 5 wt % ethylene glycol, 43.5 wt % RO water, and 46.5 wt % of aqueous solution of 1 M NaOH (JT Baker by Avantor, Inc., Radnor, Pa.; catalog #5635) was prepared as in EXAMPLE 30 and achieved DN of 67 mol %. The UV treatment of the feed stream was the same as in EXAMPLE 30. The viscosity of the feed stream was measured with a parallel plate fixture in oscillatory mode, and at 1 rad/s it was measured as 62.6 Pa·s. The viscosity of the product stream was measured with a cup and bob fixture in steady mode, and at 4 s$^{-1}$ was measured as 170 mPa·s. Thus, the wall shear stress was calculated as 0.3 kPa, the viscosity ratio of the two streams was 2.7×10$^{-3}$, and its negative logarithm was 2.6. PAA in the product stream was not decarboxylated per FTIR spectrum analysis similar to EXAMPLES 1 to 5

Comparative EXAMPLE 34 shows that, surprisingly, in a flow system UV and H$_2$O$_2$ together degrade SAP (which is crosslinked PAA; see inventive EXAMPLE 16) much more than PAA (which is slightly branched or linear) with DN about the same as that of SAP. The feed stream of comparative EXAMPLE 34 has 5 wt % PAA, 5 wt % ethylene glycol, 43.5 wt % of 3 wt % H$_2$O$_2$ solution, and 46.5 wt % of 1 M NaOH solution. The results from this comparative EXAMPLE are also shown in TABLE 3.

Example 34—Comparative

A feed stream with 5 wt % PAA, 5 wt % ethylene glycol, 43.5 wt % of 3 wt % H$_2$O$_2$ solution and 46.5 wt % aqueous solution of 1 M NaOH was prepared as in EXAMPLE 30 and achieved DN of 67 mol %. The UV treatment of the feed stream was the same as in EXAMPLE 1. The viscosity of the feed stream was measured with a parallel plate fixture in oscillatory mode, and at 1 rad/s it was measured as 77.5 Pa·s. The viscosity of the product stream was measured with a cup and bob fixture in steady mode, and at 4 s$^{-1}$ was measured as 56.7 mPa·s. Thus, the wall shear stress was calculated as 0.4 kPa, the viscosity ratio of the two streams was 7.3×10$^{-4}$, and its negative logarithm was 3.1.

The compositions of the feed streams, experimental conditions, and results from EXAMPLES 2, 7, 11, 16, 21, and 29 to 34 are summarized in TABLE 3 below (the flow rate was 3 mL/min in all EXAMPLES).

TABLE 3

| EXAMPLE # | SAP, [wt %] | (750 kg/mol), [wt %] | RO Water, [wt %] | EG, [wt %] | 3 wt % H$_2$O$_2$ Solution, [wt %] | 1M NaOH Solution, [wt %] | DN, [%] | −LOG (Viscosity Ratio), [−] |
|---|---|---|---|---|---|---|---|---|
| 2  | 2.5 | —   | 97.5 | —   | —    | —    | 68 | 5   |
| 21 | 2.5 | —   | 95   | 2.5 | —    | —    | 68 | 4.5 |
| 11 | 2.5 | —   | —    | —   | 97.5 | —    | 68 | 5.7 |
| 30 | —   | 2.5 | 95   | 2.5 | —    | —    | 0  | 2.2 |
| 7  | 5   | —   | 95   | —   | —    | —    | 68 | 3.4 |
| 16 | 5   | —   | —    | —   | 95   | —    | 68 | 5.4 |
| 29 | 5   | 90  | 5    | —   | —    | —    | 68 | 2.9 |
| 31 | —   | 5   | 90   | 5   | —    | —    | 0  | 0.4 |
| 32 | —   | 5   | —    | 5   | 90   | —    | 0  | 3.3 |
| 33 | —   | 5   | 43.5 | 5   | 0    | 46.5 | 67 | 2.6 |
| 34 | —   | 5   | —    | 5   | 43.5 | 46.5 | 67 | 3.1 |

Comparative EXAMPLES 35 to 39 show that, surprisingly, in a static system UV degrades SAP to a much less degree than in a flow system (e.g. see EXAMPLES 1 to 5). The feed stream of comparative EXAMPLES 35 to 39 has 2.5 wt % PAA and 97.5 wt % RO water. The results from these comparative EXAMPLES are also shown in TABLE 4 and FIG. 1.

Example 35—Comparative

A feed stream with 2.5 wt % SAP and 97.5 wt % RO water was prepared as in EXAMPLE 1 and loaded in a quartz cup (1.75 in. (4.45 cm) in internal diameter) so that the thickness of the feed stream was about 4 mm, which is the same as the thickness of the feed stream inside the quartz tube used in the flow experiments of EXAMPLES 1 to 34. The quartz cup was then placed on the conveyor belt of the UV system of EXAMPLE 1 and moved through the irradiation zone at a speed of 16.5 cm/min, which results in a residence time of the quartz cup in the irradiation zone of 54.8 s and UV irradiation energy calculated as 5 MJ/kg SAP. The product stream was produced in the quartz cup at the end of the quartz cup travel time. The viscosity of the feed stream was measured with a parallel plate fixture in oscillatory mode, and at 1 rad/s was measured as 635.7 Pa·s. The viscosity of the product stream was measured with a parallel plate fixture in steady mode, and at 4 $s^{-1}$ was measured as 1.82 Pa·s. Thus, the wall shear stress was 0 kPa, the viscosity ratio of the two streams was $2.9 \times 10^{-3}$, and its negative logarithm was 2.5. PAA in the product stream was not decarboxylated per FTIR spectrum analysis similar to EXAMPLES 1 to 5. The product stream was analyzed using the GPC-T technique in duplicates and yielded the following average values: $M_n=116,108$ Da; $M_w=298,332$ Da; $M_z=956,648$ Da; and PDI=2.57.

Example 36—Comparative

The feed stream of EXAMPLE 35, with 2.5 wt % SAP and 97.5 wt % RO water, was loaded in a quartz cup (1.75 in. (4.45 cm) in internal diameter) so that the thickness of the feed stream was about 4 mm, which is the same as the thickness of the feed stream inside the quartz tube used in the flow experiments of EXAMPLES 1 to 34. The quartz cup was then placed on the conveyor belt of the UV system of EXAMPLE 1 and moved through the irradiation zone at a speed of 26.7 cm/min, which results in a residence time of the quartz cup in the irradiation zone of 33.7 s and UV irradiation energy calculated as 3.1 MJ/kg SAP. The product stream was produced in the quartz cup at the end of the quartz cup travel time. The viscosity of the product stream was measured with a parallel plate fixture in steady mode, and at 4 $s^{-1}$ was measured as 7.33 Pa·s. Thus, the wall shear stress was 0 kPa, the viscosity ratio of the two streams was $1.2 \times 10^{-2}$, and its negative logarithm was 1.9. PAA in the product stream was not decarboxylated per FTIR spectrum analysis similar to EXAMPLES 1 to 5. The product stream was analyzed using the GPC-T technique in duplicates and yielded the following average values: $M_n=152,882$ Da; $M_w=366,826$ Da; $M_z=948,670$ Da; and PDI=2.4.

Example 37—Comparative

The feed stream of EXAMPLE 35, with 2.5 wt % SAP and 97.5 wt % RO water, was loaded in a quartz cup (1.75 in. (4.45 cm) in internal diameter) so that the thickness of the feed stream was about 4 mm, which is the same as the thickness of the feed stream inside the quartz tube used in the flow experiments of EXAMPLES 1 to 34. The quartz cup was then placed on the conveyor belt of the UV system of EXAMPLE 1 and moved through the irradiation zone at a speed of 56 cm/min, which results in a residence time of the quartz cup in the irradiation zone of 16.1 s and UV irradiation energy calculated as 1.5 MJ/kg SAP. The product stream was produced in the quartz cup at the end of the quartz cup travel time. The viscosity of the product stream was measured with a parallel plate fixture in steady mode, and at 4 $s^{-1}$ was measured as 49.1 Pa·s. Thus, the wall shear stress was 0 kPa, the viscosity ratio of the two streams was $7.7 \times 10^{-2}$, and its negative logarithm was 1.1. PAA in the product stream was not decarboxylated per FTIR spectrum analysis similar to EXAMPLES 1 to 5. The product stream was analyzed using the GPC-T technique in duplicates and yielded the following average values: $M_n=225,428$ Da; $M_w=506,164$ Da; $M_z=1,575,500$ Da; and PDI=2.25.

Example 38—Comparative

The feed stream of EXAMPLE 35, with 2.5 wt % SAP and 97.5 wt % RO water, was loaded in a quartz cup (1.75 in. (4.45 cm) in internal diameter) so that the thickness of the feed stream was about 4 mm, which is the same as the thickness of the feed stream inside the quartz tube used in the flow experiments of EXAMPLES 1 to 34. The quartz cup was then placed on the conveyor belt of the UV system of EXAMPLE 1 and moved through the irradiation zone at a speed of 84.4 cm/min, which results in a residence time of the quartz cup in the irradiation zone of 10.7 s and UV irradiation energy calculated as 1 MJ/kg SAP. The product stream was produced in the quartz cup at the end of the quartz cup travel time. The viscosity of the product stream was measured with a parallel plate fixture in steady mode, and at 4 $s^{-1}$ was measured as 77.1 Pa·s. Thus, the wall shear stress was 0 kPa, the viscosity ratio of the two streams was $1.2 \times 10^{-1}$, and its negative logarithm was 0.9. PAA in the product stream was not decarboxylated per FTIR spectrum analysis similar to EXAMPLES 1 to 5. The product stream was analyzed using the GPC-T technique in duplicates and yielded the following average values: $M_n=243,365$ Da; $M_w=531,523$ Da; $M_z=1,206,500$ Da; and PDI=2.18.

Example 39—Comparative

The feed stream of EXAMPLE 35, with 2.5 wt % SAP and 97.5 wt % RO water, was loaded in a quartz cup (1.75 in. (4.45 cm) in internal diameter) so that the thickness of the feed stream was about 4 mm, which is the same as the thickness of the feed stream inside the quartz tube used in the flow experiments of EXAMPLES 1 to 34. The quartz cup was then placed on the conveyor belt of the UV system of EXAMPLE 1 and moved through the irradiation zone at a speed of 179.9 cm/min, which results in a residence time of the quartz cup in the irradiation zone of 5 s and UV irradiation energy calculated as 0.5 MJ/kg SAP. The product stream was produced in the quartz cup at the end of the quartz cup travel time. The viscosity of the product stream was measured with a parallel plate fixture in steady mode, and at 4 $s^{-1}$ was measured as 189.1 Pa·s. Thus, the wall shear stress was 0 kPa, the viscosity ratio of the two streams was $3 \times 10^{-1}$, and its negative logarithm was 0.5. PAA in the product stream was not decarboxylated per FUR spectrum analysis similar to EXAMPLES 1 to 5. The product stream was analyzed using the GPC-T technique in duplicates and yielded the following average values: $M_n$=247,896 Da; $M_w$=463,175 Da; $M_z$=1,090,500 Da; and PDI=1.76.

Figure 5:
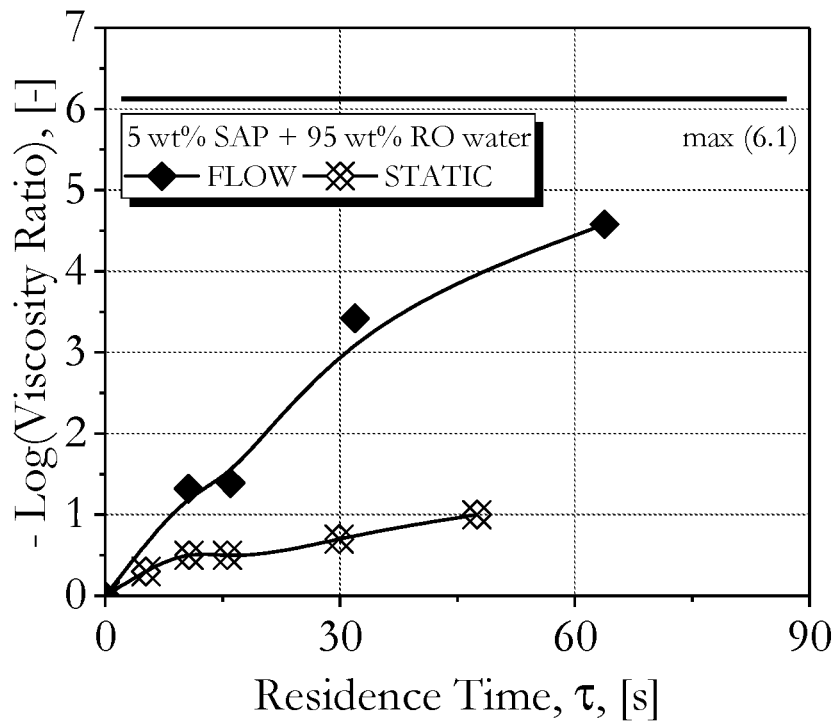
FIG. 5 is a graph showing the negative logarithm of the viscosity ratio between the feed and product streams as a function of the residence time of the feed stream in the irradiation zone of the UV equipment for a flow system and a static system. The curves are for the 5 wt % SAP and 95 wt % RO water feed stream.
Figure 6:
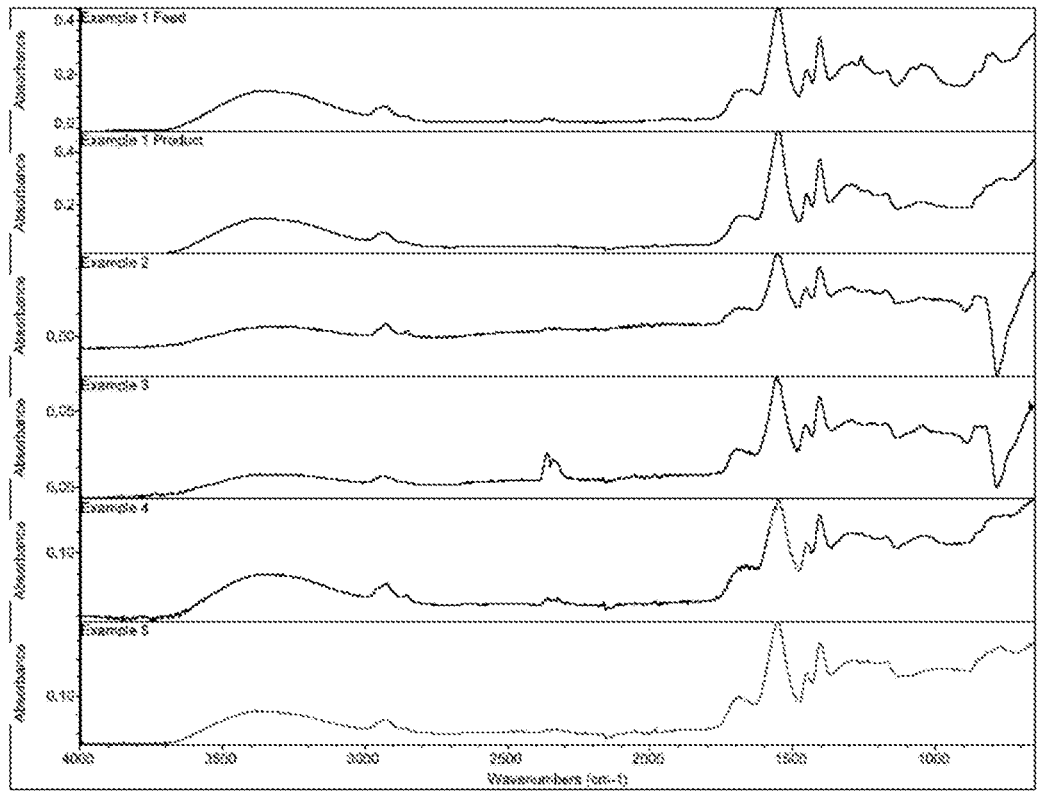
FIG. 6 is a graph showing FTIR spectra of feed stream SAP (EXAMPLE 1) and product stream PAA (EXAMPLES 1 to 5) acquired by Thermo Scientific™ Nicolet™ iS50 FT-IR Spectrometer (Golden Gate KRSS ATR with diamond crystal, ZnSe lenses). COO⁻ (sym) is shown at about 1400 $cm^{-1}$ and COO⁻ (antisym) is shown at about 1600 $cm^{-1}$ for neutralized PAA; and C=O is shown at about 1700 $cm^{-1}$ for non-neutralized PAA (see Kirwan, L. J., et al., Langmuir, 19 (2003), 5802-5807).

Comparative EXAMPLES 40 to 44 show that, surprisingly, in a static system UV degrades SAP to a much less degree than in a flow system (e.g. see EXAMPLES 6 to 9). The feed stream of comparative EXAMPLES 40 to 44 has 5 wt % PAA and 95 wt % RO water. The results from these comparative EXAMPLES are also shown in FIG. 5.

Example 40—Comparative

A feed stream with 5 wt % SAP and 95 wt % RO water was prepared as in EXAMPLE 6 and loaded in a quartz cup (1.75 in. (4.45 cm) in internal diameter) so that the thickness of the feed stream was about 4 mm, which is the same as the thickness of the feed stream inside the quartz tube used in the flow experiments of EXAMPLES 1 to 34. The quartz cup was then placed on the conveyor belt of the UV system of EXAMPLE 1 and moved through the irradiation zone at a speed of 18.9 cm/min, which results in a residence time of the quartz cup in the irradiation zone of 47.5 s and UV irradiation energy calculated as 4.3 MJ/kg SAP. The product stream was produced in the quartz cup at the end of the quartz cup travel time. The viscosity of the feed stream was measured with a parallel plate fixture in oscillatory mode, and at 1 rad/s was measured as 1352.7 Pa·s. The viscosity of the product stream was measured with a parallel plate fixture in steady mode, and at 4 s$^{-1}$ was measured as 149.3 Pa·s. Thus, the wall shear stress was 0 kPa, the viscosity ratio of the two streams was $1.1 \times 10^{-1}$, and its negative logarithm was 1.

Example 41—Comparative

The feed stream of EXAMPLE 40, with 5 wt % SAP and 95 wt % RO water, was loaded in a quartz cup (1.75 in. (4.45 cm) in internal diameter) so that the thickness of the feed stream was about 4 mm, which is the same as the thickness of the feed stream inside the quartz tube used in the flow experiments of EXAMPLES 1 to 34. The quartz cup was then placed on the conveyor belt of the UV system of EXAMPLE 1 and moved through the irradiation zone at a speed of 30.1 cm/min, which results in a residence time of the quartz cup in the irradiation zone of 29.9 s and UV irradiation energy calculated as 2.7 MJ/kg SAP. The product stream was produced in the quartz cup at the end of the quartz cup travel time. The viscosity of the product stream was measured with a parallel plate fixture in steady mode, and at 4 s$^{-1}$ was measured as 243.3 Pa·s. Thus, the wall shear stress was 0 kPa, the viscosity ratio of the two streams was $1.8 \times 10^{-1}$, and its negative logarithm was 0.7.

Example 42—Comparative

The feed stream of EXAMPLE 40, with 5 wt % SAP and 95 wt % RO water, was loaded in a quartz cup (1.75 in. (4.45 cm) in internal diameter) so that the thickness of the feed stream was about 4 mm, which is the same as the thickness of the feed stream inside the quartz tube used in the flow experiments of EXAMPLES 1 to 34. The quartz cup was then placed on the conveyor belt of the UV system of EXAMPLE 1 and moved through the irradiation zone at a speed of 58 cm/min, which results in a residence time of the quartz cup in the irradiation zone of 15.6 s and UV irradiation energy calculated as 1.4 MJ/kg SAP. The product stream was produced in the quartz cup at the end of the quartz cup travel time. The viscosity of the product stream was measured with a parallel plate fixture in steady mode, and at 4 s$^{-1}$ was measured as 391.1 Pa·s. Thus, the wall shear stress was 0 kPa, the viscosity ratio of the two streams was $2.9 \times 10^{-1}$, and its negative logarithm was 0.5.

Example 43—Comparative

The feed stream of EXAMPLE 40, with 5 wt % SAP and 95 wt % RO water, was loaded in a quartz cup (1.75 in. (4.45 cm) in internal diameter) so that the thickness of the feed stream was about 4 mm, which is the same as the thickness of the feed stream inside the quartz tube used in the flow experiments of EXAMPLES 1 to 34. The quartz cup was then placed on the conveyor belt of the UV system of EXAMPLE 1 and moved through the irradiation zone at a speed of 84.4 cm/min, which results in a residence time of the quartz cup in the irradiation zone of 10.7 s and UV irradiation energy calculated as 1 MJ/kg SAP. The product stream was produced in the quartz cup at the end of the quartz cup travel time. The viscosity of the product stream was measured with a parallel plate fixture in steady mode, and at 4 s$^{-1}$ was measured as 476 Pa·s. Thus, the wall shear stress was 0 kPa, the viscosity ratio of the two streams was $3.5 \times 10^{-1}$, and its negative logarithm was 0.5.

Example 44—Comparative

The feed stream of EXAMPLE 40, with 5 wt % SAP and 95 wt % RO water, was loaded in a quartz cup (1.75 in. (4.45 cm) in internal diameter) so that the thickness of the feed stream was about 4 mm, which is the same as the thickness of the feed stream inside the quartz tube used in the flow experiments of EXAMPLES 1 to 34. The quartz cup was then placed on the conveyor belt of the UV system of EXAMPLE 1 and moved through the irradiation zone at a speed of 173.8 cm/min, which results in a residence time of the quartz cup in the irradiation zone of 5.2 s and UV irradiation energy calculated as 0.5 MJ/kg SAP. The product stream was produced in the quartz cup at the end of the quartz cup travel time. The viscosity of the product stream was measured with a parallel plate fixture in steady mode, and at 4 s$^{-1}$ was measured as 709.9 Pa·s. Thus, the wall shear stress was 0 kPa, the viscosity ratio of the two streams was $5.2 \times 10^{-1}$, and its negative logarithm was 0.3.

Comparative EXAMPLES 45 to 49 show that, surprisingly, in a static system UV and $H_2O_2$ together degrade SAP to a much less degree than in a flow system (e.g. see EXAMPLES 10 to 14). The feed stream of comparative EXAMPLES 45 to 49 has 2.5 wt % PAA and 97.5 wt % of 3 wt % $H_2O_2$ solution. The results from these comparative EXAMPLES are also shown in TABLE 4 and FIG. 3.

Example 45—Comparative

A feed stream, with 2.5 wt % SAP and 97.5 wt % of 3 wt % $H_2O_2$ solution, was prepared as in EXAMPLE 10 and loaded in a quartz cup (1.75 in. (4.45 cm) in internal diameter) so that the thickness of the feed stream was about 4 mm, which is the same as the thickness of the feed stream inside the quartz tube used in the flow experiments of EXAMPLES 1 to 34. The quartz cup was then placed on the conveyor belt of the UV system of EXAMPLE 1 and moved through the irradiation zone at a speed of 20.7 cm/min, which results in a residence time of the quartz cup in the irradiation zone of 43.5 s and UV irradiation energy calculated as 4.0 MJ/kg SAP. The product stream was produced in the quartz cup at the end of the quartz cup travel time. The viscosity of the feed stream was measured with a parallel plate fixture in oscillatory mode, and at 1 rad/s was measured as 497.5 Pa·s. The viscosity of the product stream was measured with a cup and bob fixture in steady mode, and at 4 s$^{-1}$ was measured as 1 mPa·s. Thus, the wall shear stress was 0 kPa, the viscosity ratio of the two streams was 2×10$^{-6}$, and its negative logarithm was 5.7.

Example 46—Comparative

The feed stream of EXAMPLE 45, with 2.5 wt % SAP and 97.5 wt % of 3 wt % $H_2O_2$ solution, was loaded in a quartz cup (1.75 in. (4.45 cm) in internal diameter) so that the thickness of the feed stream was about 4 mm, which is the same as the thickness of the feed stream inside the quartz tube used in the flow experiments of EXAMPLES 1 to 34. The quartz cup was then placed on the conveyor belt of the UV system of EXAMPLE 1 and moved through the irradiation zone at a speed of 29.3 cm/min, which results in a residence time of the quartz cup in the irradiation zone of 30.9 s and UV irradiation energy calculated as 2.8 MJ/kg SAP. The product stream was produced in the quartz cup at the end of the quartz cup travel time. The viscosity of the product stream was measured with a cup and bob fixture in steady mode, and at 4 s$^{-1}$ was measured as 1.4 mPa·s. Thus, the wall shear stress was 0 kPa, the viscosity ratio of the two streams was 2.8×10$^{-6}$, and its negative logarithm was 5.5.

Example 47—Comparative

The feed stream of EXAMPLE 45, with 2.5 wt % SAP and 97.5 wt % of 3 wt % $H_2O_2$ solution, was loaded in a quartz cup (1.75 in. (4.45 cm) in internal diameter) so that the thickness of the feed stream was about 4 mm, which is the same as the thickness of the feed stream inside the quartz tube used in the flow experiments of EXAMPLES 1 to 34. The quartz cup was then placed on the conveyor belt of the UV system of EXAMPLE 1 and moved through the irradiation zone at a speed of 57.4 cm/min, which results in a residence time of the quartz cup in the irradiation zone of 15.7 s and UV irradiation energy calculated as 1.4 MJ/kg SAP. The product stream was produced in the quartz cup at the end of the quartz cup travel time. The viscosity of the product stream was measured with a cup and bob fixture in steady mode, and at 4 s$^{-1}$ was measured as 94 mPa·s. Thus, the wall shear stress was 0 kPa, the viscosity ratio of the two streams was 1.9×10$^4$, and its negative logarithm was 3.7.

Example 48—Comparative

The feed stream of EXAMPLE 45, with 2.5 wt % SAP and 97.5 wt % of 3 wt % $H_2O_2$ solution, was loaded in a quartz cup (1.75 in. (4.45 cm) in internal diameter) so that the thickness of the feed stream was about 4 mm, which is the same as the thickness of the feed stream inside the quartz tube used in the flow experiments of EXAMPLES 1 to 34. The quartz cup was then placed on the conveyor belt of the UV system of EXAMPLE 1 and moved through the irradiation zone at a speed of 83.2 cm/min, which results in a residence time of the quartz cup in the irradiation zone of 10.8 s and UV irradiation energy calculated as 1.0 MJ/kg SAP. The product stream was produced in the quartz cup at the end of the quartz cup travel time. The viscosity of the product stream was measured with a cup and bob fixture in steady mode, and at 4 s$^{-1}$ was measured as 633 mPa·s. Thus, the wall shear stress was 0 kPa, the viscosity ratio of the two streams was 1.3×10$^{-3}$, and its negative logarithm was 2.9.

Example 49—Comparative

The feed stream of EXAMPLE 45, with 2.5 wt % SAP and 97.5 wt % of 3 wt % $H_2O_2$ solution, was loaded in a quartz cup (1.75 in. (4.45 cm) in internal diameter) so that the thickness of the feed stream was about 4 mm, which is the same as the thickness of the feed stream inside the quartz tube used in the flow experiments of EXAMPLES 1 to 34. The quartz cup was then placed on the conveyor belt of the UV system of EXAMPLE 1 and moved through the irradiation zone at a speed of 181 cm/min, which results in a residence time of the quartz cup in the irradiation zone of 4.9 s and UV irradiation energy calculated as 0.5 MJ/kg SAP. The product stream was produced in the quartz cup at the end of the quartz cup travel time. The viscosity of the product stream was measured with a parallel plate fixture in oscillatory mode, and at 1 rad/s was measured as 78.2 Pa·s. Thus, the wall shear stress was 0 kPa, the viscosity ratio of the two streams was 1.6×10$^{-1}$, and its negative logarithm was 0.8.

The compositions of the feed streams, experimental conditions, and results from EXAMPLES 1 to 3, 10, 12, 35 to 39, and 45 to 49 are summarized in TABLE 4 below.

TABLE 4

| EXAMPLE # | SAP, [wt %] | RO Water, [wt %] | 3 wt % $H_2O_2$ Solution, [wt %] | Flow Rate, [mL/min] | Residence Time, [s] | UV Irradiation Energy, [MJ/kg SAP] | −LOG (Viscosity Ratio), [−] |
|---|---|---|---|---|---|---|---|
| 1 | 2.5 | 97.5 | — | 1.5 | 63.8 | 5.8 | 5.2 |
| 2 | 2.5 | 97.5 | — | 3 | 31.9 | 2.9 | 5 |
| 3 | 2.5 | 97.5 | — | 6 | 16 | 1.4 | 3.8 |
| 10 | 2.5 | — | 97.5 | 1.5 | 63.8 | 5.8 | 5.8 |
| 12 | 2.5 | — | 97.5 | 6 | 16 | 1.4 | 5.3 |
| 35 | 2.5 | 97.5 | — | 0; Static | 54.8 | 5 | 2.5 |
| 36 | 2.5 | 97.5 | — | 0; Static | 33.7 | 3.1 | 1.9 |
| 37 | 2.5 | 97.5 | — | 0; Static | 16.1 | 1.5 | 1.1 |
| 38 | 2.5 | 97.5 | — | 0; Static | 10.7 | 1 | 0.9 |
| 39 | 2.5 | 97.5 | — | 0; Static | 5 | 0.5 | 0.5 |
| 45 | 2.5 | — | 97.5 | 0; Static | 43.5 | 4 | 5.7 |
| 46 | 2.5 | — | 97.5 | 0; Static | 30.9 | 2.8 | 5.5 |
| 47 | 2.5 | — | 97.5 | 0; Static | 15.7 | 1.4 | 3.7 |
| 48 | 2.5 | — | 97.5 | 0; Static | 10.8 | 1 | 2.9 |
| 49 | 2.5 | — | 97.5 | 0; Static | 4.9 | 0.5 | 0.8 |

Figure 2:
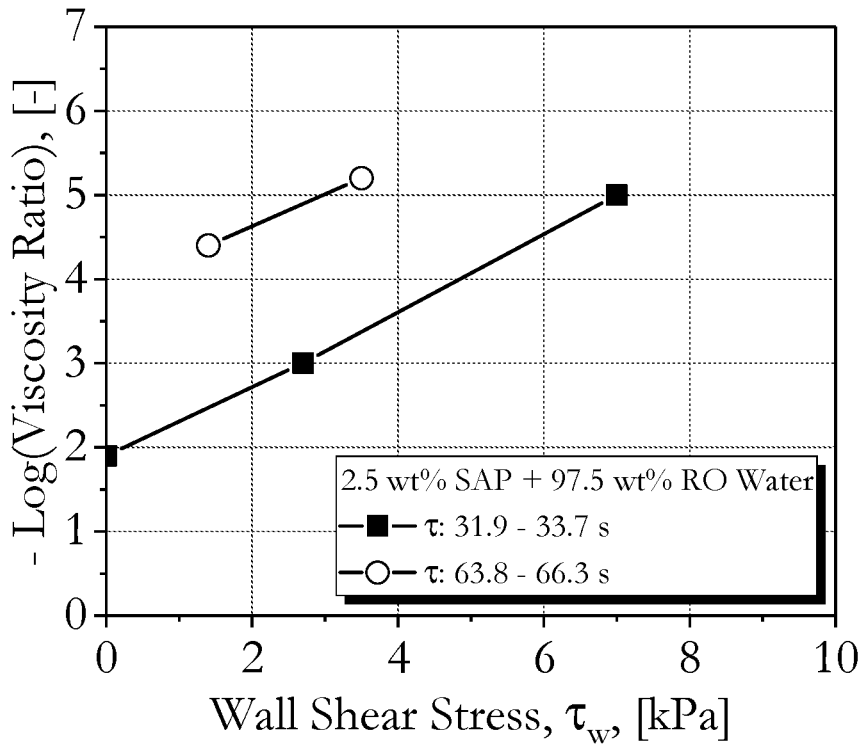
FIG. 2 is a graph showing the negative logarithm of the viscosity ratio between the feed and product streams as a function of the wall shear stress $\tau_w$ of the feed stream in the irradiation zone of the UV equipment for both a flow system (in two separate tubes with a small and a large ID) and a static system ($\tau_w=0$). The curves are for the 2.5 wt % SAP and 97.5 wt % RO water feed stream.

Inventive EXAMPLES 50 to 52 show that, surprisingly, in a flow system with lower wall shear stress UV degrades SAP to a much less degree than in a flow system with higher wall shear stress (e.g. see EXAMPLES 1 to 5). The feed stream of inventive EXAMPLES 50 to 52 has 2.5 wt % SAP and 97.5 wt % RO water. The results from these inventive EXAMPLES are also shown in FIG. 1. Results from EXAMPLES 1, 2, 36, 51, and 52 are also shown graphically in FIG. 2. At a constant residence time, the higher the wall shear stress the higher the negative logarithm of the viscosity ratio is, i.e., the higher the SAP degradation is.

Example 50

A feed stream with 2.5 wt % SAP and 97.5 wt % RO water was prepared as in EXAMPLE 1. The feed stream was loaded in the same equipment of EXAMPLE 1 and run at a rate of 3 mL/min; however, the quartz tube had ID of 0.75 cm. These conditions resulted in residence time in the irradiation zone of 133.5 s, and UV irradiation energy calculated as 5.9 MJ/kg SAP. The product stream was collected at the end of the quartz tube in a beaker. The viscosity of the feed stream was measured with a parallel plate fixture in oscillatory mode and the viscosity of the product stream was measured with a cup and bob fixture in steady mode. The complex viscosity of the feed stream at 1 rad/s was measured as 562.7 Pa·s and the steady viscosity of the product stream at 4 $s^{-1}$ was measured as 4.7 mPa·s. Thus, the wall shear stress was calculated as 0.7 kPa, the viscosity ratio of the two streams was $8.4 \times 10^{-6}$, and its negative logarithm was 5.1.

Example 51

The feed stream of EXAMPLE 50 was loaded in the same equipment of EXAMPLE 50 and run at a rate of 6 mL/min. These conditions resulted in residence time in the irradiation zone of 66.3 s, and UV irradiation energy calculated as 3 MJ/kg SAP. The product stream was collected at the end of the quartz tube in a beaker. The steady viscosity of the product stream at 4 $s^{-1}$ was measured as 24 mPa·s. Thus, the wall shear stress was calculated as 1.4 kPa, the viscosity ratio of the two streams was $4.3 \times 10^{-5}$, and its negative logarithm was 4.4.

Example 52

The feed stream of EXAMPLE 50 was loaded in the same equipment of EXAMPLE 50 and run at a rate of 12 mL/min. These conditions resulted in residence time in the irradiation zone of 33.1 s, and UV irradiation energy calculated as 1.5 MJ/kg SAP. The product stream was collected at the end of the quartz tube in a beaker. The steady viscosity of the product stream at 4 $s^{-1}$ was measured as 0.63 Pa·s. Thus, the wall shear stress was calculated as 2.7 kPa, the viscosity ratio of the two streams was $1.1 \times 10^{-3}$, and its negative logarithm was 3.

Figure 7:
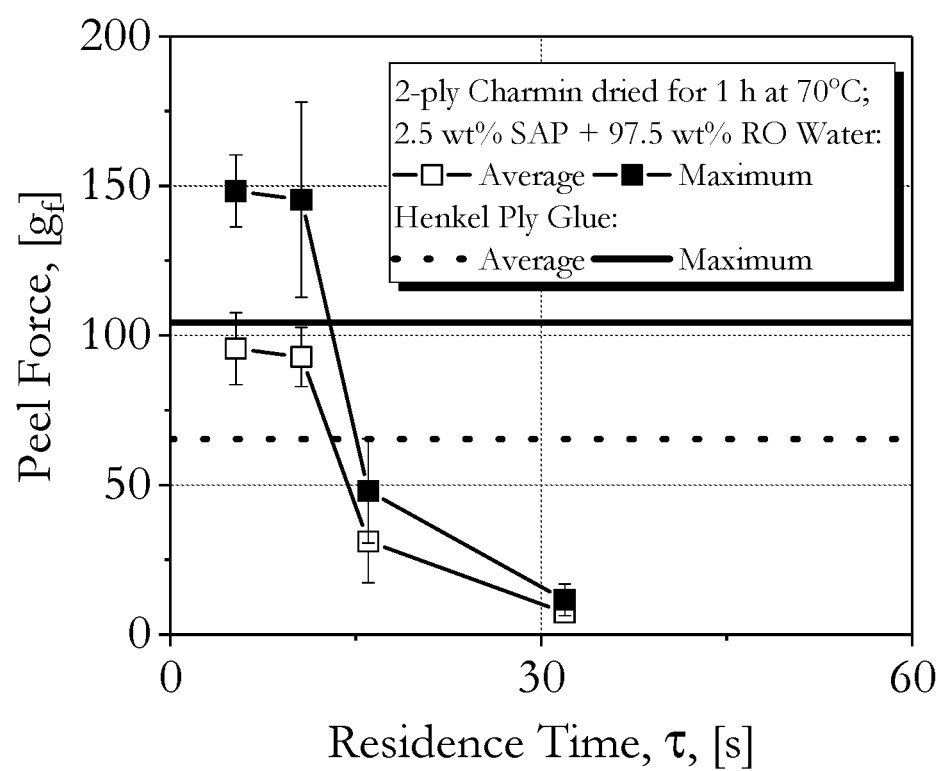
FIG. 7 is a graph showing the peel force (both average and maximum) as a function of the residence time of the feed stream in the irradiation zone of the UV equipment for a flow system. The curves are for the 2.5 wt % SAP and 97.5 wt % RO water feed stream.

Inventive EXAMPLE 53 shows the adhesive properties of a series of PAA product streams for Charmin as a function of residence time in a flow system with a feed stream of 2.5 wt % SAP and 97.5 wt % RO water. Also, the adhesive properties of a ply glue based on poly(vinyl alcohol) (PVOH) are shown as control. Two of the product streams had better adhesive properties than the control, whereas the other three product streams did not. The results of inventive EXAMPLE 53 are shown in TABLE 5 and FIG. 7.

Example 53—Adhesive Properties

Single ply Charmin toilet paper sheets (commercial product from the Procter & Gamble Co.), with area 10 cm by 10 cm (7.5 cm×10 cm treated) and a basis weight of 67.5 g per square meter (67.5 gsm), were treated with 0.5 g of UV treated SAP from EXAMPLES 2 to 5, and as a control, a ply glue based on poly(vinyl alcohol) (PVOH) at 4.4 wt % solids (Henkel N6017, from Henkel USA, Stamford, Conn.). The treatment loading levels per sheet were calculated based on the formula: (desired treatment level)×(area/concentration of treated SAP)=loading of SAP solution in g. So, for EXAMPLE 2 to load one Charmin sheet at 0.5 gsm the formula would be: 0.5 gsm×0.0075 (gsm)/2.5 wt %=0.15 g of SAP treated solution. A 90 µL capacity syringe was used to add the desired loading dropwise to a sheet of Teflon that was taped to produce a 7.5 cm×10 cm square area. The drops were spread evenly over the area with a spatula and one ply of Charmin was placed over the area. A roller was used to incorporate the adhesive solution onto the single ply. This ply was then rolled onto another ply bonding the 2 sheets together. Note that the actual size of the sheets was 10 cm×10 cm leaving a 2.5 cm strip for peel testing. The sheets were dried in an oven at 70° C. for 1 h and left at room temperature overnight. T-peel tests (ASTM D-1876) were performed on an Instron test frame (Model 5965; Instron Company, Norwood, Mass.) with a 10 N load cell. The grip separation was 2.54 cm and test speed was 5.08 cm/min. The data were collected over the 2.54 cm by 8.89 cm section of the pull and 50 peaks and valleys were averaged by the software to give the peel strength in gf.

The compositions of the feed streams, flowrate, and results from EXAMPLES 2 to 5, and 53 are summarized in TABLE 5 below. Results from EXAMPLE 53 are also shown graphically in FIG. 7.

TABLE 5

| EXAMPLE # | SAP, [wt %] | RO Water, [wt %] | PVOH glue [wt %] | Target loading [g] | Average Peel Force, [$g_f$] | Standard Deviation of Peel Force, [$g_f$] |
|---|---|---|---|---|---|---|
| 53 | — | 95.6 | 4.4 | 0.085 | 65.3 | 19.4 |
| 2 | 2.5 | 97.5 | — | 0.15 | 7.3 | 3.4 |
| 3 | 2.5 | 97.5 | — | 0.15 | 31.1 | 13.8 |
| 4 | 2.5 | 97.5 | — | 0.15 | 92.8 | 9.9 |
| 5 | 2.5 | 97.5 | — | 0.15 | 95.6 | 12 |

Inventive EXAMPLE 54 shows that in a flow system UV degrades SAP in the presence of NaCl and urea (to simulate a used SAP) to about the same degree as in the absence of saline and urea. In inventive EXAMPLE 54, the feed stream had 2.5 wt % SAP, 0.5 wt % NaCl, 0.5 wt % urea, and 96.5 wt % RO water. The results of inventive EXAMPLE 55 and inventive EXAMPLE 2 for comparison are shown in TABLE 6.

Example 54

A feed stream with 2.5 wt % SAP, 0.5 wt % sodium chloride (NaCl; Sigma-Aldrich; product #310166; reagent grade with ≥98%), 0.5 wt % urea (to simulate a used SAP; Sigma-Aldrich; product #U1250; ReagentPlus® with ≥99.5%), and 96.5 wt % RO water was prepared as in EXAMPLE 1. The feed stream was loaded in the same equipment of EXAMPLE 1 and run at a rate of 3 mL/min, which resulted in residence time in the irradiation zone of 31.9 s, and UV irradiation energy calculated as 2.9 MJ/kg SAP. The viscosity of the feed stream was measured with a parallel plate fixture in oscillatory mode, and at 1 rad/s it was measured as 417 Pa·s. The viscosity of the product stream was measured with a cup and bob fixture in steady mode, and at 4 s$^{-1}$ it was measured as 6.4 mPa·s. Thus, the viscosity ratio of the two streams was 1.5×10$^{-5}$, and its negative logarithm was 4.8.

Inventive EXAMPLE 55 shows that in a flow system UV degrades another grade of SAP ("STC 16133") to about the same degree as the grade of SAP ("GIC 31187") used in all the previous inventive and comparative EXAMPLES. In inventive EXAMPLE 55, the feed stream had 2.5 wt % SAP and 97.5 wt % RO water. The results of inventive EXAMPLE 55 and inventive EXAMPLE 2 for comparison are shown in TABLE 6.

Example 55

A feed stream with 2.5 wt % SAP ("STC 16133"; from the Procter & Gamble Co.; with properties reported in the Methods section VIII) and 97.5 wt % RO water was prepared as in EXAMPLE 1. The feed stream was loaded in the same equipment of EXAMPLE 1 and run at a rate of 3 mL/min, which resulted in residence time in the irradiation zone of 31.9 s, and UV irradiation energy calculated as 2.9 MJ/kg SAP. The viscosity of the feed stream was measured with a parallel plate fixture in oscillatory mode, and at 1 rad/s it was measured as 1295.8 Pa·s. The viscosity of the product stream was measured with a cup and bob fixture in steady mode, and at 4 s$^{-1}$ it was measured as 175 mPa·s. Thus, the viscosity ratio of the two streams was 1.4×10$^{-5}$, and its negative logarithm was 4.9.

The compositions of the feed streams, flowrate, and results from EXAMPLES 2, 54, and 55 are summarized in TABLE 6 below.

TABLE 6

| EXAMPLE # | SAP, [wt %] | RO Water, [wt %] | Sodium Chloride, [wt %] | Urea, [wt %] | Flow Rate, [mL/min] | −LOG (Viscosity Ratio), [−] |
|---|---|---|---|---|---|---|
| 2 | 2.5 ("GIC 31187") | 97.5 | — | — | 3 | 5 |
| 54 | 2.5 ("GIC 31187") | 96.5 | 0.5 | 0.5 | 3 | 4.8 |
| 55 | 2.5 ("STC 16133") | 97.5 | — | — | 3 | 4.9 |

Inventive EXAMPLES 58 and 59 show that the amount of extractables from SAP, produced by the incorporation of about 5.1% of PAA (part of the product stream; from degraded SAP) into virgin SAP (comparative EXAMPLE 56), was about half of the amount of extractables from SAP, produced by the incorporation of about 5.1% of commercial PAA into virgin SAP (comparative EXAMPLE 57).

Example 56—Comparative 112.7 g of distilled water were charged to a 500 mL round bottom flange neck flask fitted with a 4-port flange lid and water-cooled condenser. The flask was cooled in an ice water bath. 46 g of Acrylic Acid (Cat #213040; 99.5%, low water, stabilized; Beantown Chemical, Hudson, N.H.) were added and stirred with a football shaped magnetic stirrer. 34.73 g of Sodium Hydroxide (Cat #415413; 50% in water; Sigma-Aldrich, St Louis, Mo.) were added in small aliquots, keeping the temperature of the mixture between 17° C. and 30° C. After this addition the ice bath was removed. 0.335 g polyethylene glycol diacrylate (Cat #455008; $M_n$ of 700 Da; Sigma-Aldrich) were dissolved in 3.16 g distilled water and added to the flask. The flask was purged with nitrogen for 1 h via a stainless-steel needle inserted via septum and bubbling into the stirred contents. 0.0113 g of L-Ascorbic Acid (Cat #A0278; Reagent Grade; Sigma-Aldrich) were dissolved in 0.5 mL of distilled water and added to the flask. 0.0518 g of potassium persulfate (Cat #216224; ACS Reagent >99%; Sigma-Aldrich) and 0.0021 g of hydrogen peroxide (Stabilized, 1%; Kroger; Topical Solution USP) were dissolved in 2.5 mL of distilled water and added to the flask within 1 min of the L-Ascorbic acid. The flask was observed and when the viscosity increased enough to stop the stirrer bar, the stirrer was switched off. Temperature was monitored and after the peak exotherm had been passed the condenser was removed, the flask was closed and placed in an oven at 60° C. for 18 h. The flask was removed, cooled and the gelled contents broken up by hand into pieces approximately 1 cm round and spread in an aluminum dish. The gel was dried in a fan oven at 120° C. for 6 h, removed, cooled and ground with an IKA A 11 Basic S1 mill (IKA Works, Inc., Wilmington, N.C.). The ground powder was sieved and the fraction between 152 μm and 508 μm collected and placed in a controlled environment room at 73° F. and 50% relative humidity for 24 h. 1 g of this powder was analyzed for extractable content following EDANA method NWSP 270.0.R2 (15). The amount of extractables for this sample was 5.85%.

Example 57—Comparative 115.54 g of a 2.5 wt % PAA prepolymer solution (SOKA-LAN® PA 1105; ChemPoint Inc., Bellevue, Wash.; made by diluting 10 g of 35 wt % solution to 140 g with distilled water) were charged to a 500 mL round bottom flange neck flask fitted with a 4-port flange lid and water-cooled condenser. The flask was cooled in an ice water bath. 43.18 g of Acrylic Acid (Cat #213040; 99.5%, low water, stabilized; Beantown Chemical) were added and stirred with a football shaped magnetic stirrer. 34.73 g of Sodium Hydroxide (Cat #415413; 50% in water, Sigma-Aldrich) were added in small aliquots, keeping the temperature of the mixture between 17° C. and 30° C. After this addition the ice bath was removed. 0.335 g of polyethylene glycol diacrylate (Cat #455008; $M_n$ of 700 Da; Sigma-Aldrich) were dissolved in 3.16 g distilled water and added to the flask. The flask was purged with nitrogen for 1 h via a stainless-steel needle inserted via septum and bubbling into the stirred contents. 0.0113 g of L-Ascorbic Acid (Cat #A0278; Reagent Grade; Sigma-Aldrich) were dissolved in 0.5 mL distilled water and added to the flask. 0.0518 g of potassium persulfate (Cat #216224; ACS Reagent >99%; Sigma-Aldrich) and 0.0021 g of hydrogen peroxide (Stabilized, 1%, Kroger, Topical Solution USP) were dissolved in 2.5 mL distilled water and added to the flask within 1 min of the L-Ascorbic acid. The flask was observed and when the viscosity increased enough to stop the stirrer bar, the stirrer was switched off. Temperature was monitored and after the peak exotherm had been passed the condenser was removed, the flask was closed and placed in an oven at 60° C. for 18 h. The flask was removed, cooled and the gelled contents broken up by hand into pieces approximately 1 cm round and spread in an aluminum dish. The gel was dried in a fan oven at 120° C. for 6 h, removed, cooled and ground with an IKA All Basic S1 mill (IKA Woks, Inc.). The ground powder was sieved and the fraction between 152 µm and 508 µm collected and placed in a controlled environment room at 73° F. and 50% relative humidity for 24 h. 1 g of this powder was analyzed for extractable content following EDANA method NWSP 270.0.R2 (15). The amount of extractables for this sample was 14.02%.

Example 58

115.54 g of the product stream of EXAMPLE 3 (i.e., 2.5 wt % PAA solution (with $M_w$ of 319,114 Da) that was produced when the feed stream was irradiated with UV and flowed at 6 mL/min) were charged to a 500 mL round bottom flange neck flask fitted with a 4-port flange lid and water-cooled condenser. The flask was cooled in an ice water bath. 43.18 g of Acrylic Acid (Cat #213040; 99.5%, low water, stabilized; Beantown Chemical) were added and stirred with a football shaped magnetic stirrer. 32.96 g of Sodium Hydroxide (Cat #415413; 50% in water; Sigma-Aldrich) mixed with 1.76 g of distilled water was added in small aliquots, keeping the temperature of the mixture between 17° C. and 30° C. After this addition the ice bath was removed. 0.335 g of polyethylene glycol diacrylate (Cat #455008; $M_n$ of 700 Da; Sigma-Aldrich) were dissolved in 3.16 g distilled water and added to the flask. The flask was purged with nitrogen for 1 h via a stainless-steel needle inserted via septum and bubbling into the stirred contents. 0.0113 g of L-Ascorbic Acid (Cat #A0278; Reagent Grade; Sigma-Aldrich) was dissolved in 0.5 mL distilled water and added to the flask. 0.0518 g of potassium persulfate (Cat #216224; ACS Reagent >99%; Sigma-Aldrich) and 0.0021 g of hydrogen peroxide (Stabilized, 1%, Kroger, Topical Solution USP) were dissolved in 2.5 mL distilled water and added to the flask within 1 min of the L-Ascorbic acid. The flask was observed and when the viscosity increased enough to stop the stirrer bar, the stirrer was switched off. Temperature was monitored and after the peak exotherm had been passed the condenser was removed, the flask was closed and placed in an oven at 60° C. for 18 h. The flask was removed, cooled and the gelled contents broken up by hand into pieces approximately 1 cm round and spread in an aluminum dish. The gel was dried in a fan oven at 120° C. for 6 h, removed, cooled and ground with an IKA A11 Basic S1 mill (IKA Works, Inc.). The ground powder was sieved and the fraction between 150 µm and 500 µm collected and placed in a controlled environment room at 73° F. and 50% relative humidity for 24 h. 1 g of this powder was analyzed for extractable content following EDANA method NWSP 270.0.R2 (15). The amount of extractables for this sample was 7.35%.

Example 59

115.54 g of the product stream of EXAMPLE 1 (i.e., 2.5 wt % PAA solution (with $M_w$ of 101,403 Da) that was produced when the feed stream was irradiated with UV and flowed at 1.5 mL/min) were charged to a 500 mL round bottom flange neck flask fitted with a 4-port flange lid and water-cooled condenser. The flask was cooled in an ice water bath. 43.18 g of Acrylic Acid (Cat #213040; 99.5%, low water, stabilized; Beantown Chemical) were added and stirred with a football shaped magnetic stirrer. 32.96 g of Sodium Hydroxide (Cat #415413; 50% in water; Sigma-Aldrich) mixed with 1.76 g of distilled water were added in small aliquots, keeping the temperature of the mixture between 17° C. and 30° C. After this addition the ice bath was removed. 0.335 g of polyethylene glycol diacrylate (Cat #455008; $M_n$ of 700 Da; Sigma-Aldrich) was dissolved in 3.16 g distilled water and added to the flask. The flask was purged with nitrogen for 1 h via a stainless-steel needle inserted via septum and bubbling into the stirred contents. 0.0113 g of L-Ascorbic Acid (Cat #A0278; Reagent Grade; Sigma-Aldrich) were dissolved in 0.5 mL distilled water and added to the flask. 0.0518 g of potassium persulfate (Cat #216224; ACS Reagent >99%; Sigma-Aldrich) and 0.0021 g of hydrogen peroxide (Stabilized, 1%, Kroger, Topical Solution USP) were dissolved in 2.5 mL distilled water and added to the flask within 1 min of the L-Ascorbic acid. The flask was observed and when the viscosity increased enough to stop the stirrer bar, the stirrer was switched off. Temperature was monitored and after the peak exotherm had been passed the condenser was removed, the flask was closed and placed in an oven at 60° C. for 18 h. The flask was removed, cooled and the gelled contents broken up by hand into pieces approximately 1 cm round and spread in an aluminum dish. The gel was dried in a fan oven at 120° C. for 6 h, removed, cooled and ground with an IKA A 11 Basic S1 mill (IKA Works, Inc.). The ground powder was sieved and the fraction between 150 µm and 500 µm collected and placed in a controlled environment room at 73° F. and 50% relative humidity for 24 h. 1 g of this powder was analyzed for extractable content following EDANA method NWSP 270.0.R2 (15). The amount of extractables for this sample was 6.24%.

The compositions of the SAP and results from EXAMPLES 57 to 59 are summarized in TABLE 7 below.

TABLE 7

| EXAMPLE # | Source of PAA, [—] | PAA, [wt %] | PAA $M_w$, [kDa] | PAA PDI, [—] | Amount of Extractables, [wt %] |
|---|---|---|---|---|---|
| 56 | — | — | — | — | 5.85 |
| 57 | SOKALAN ® PA 110S | 5.1 | 250 | 2.9 | 14.02 |
| 58 | EXAMPLE 3 | 5.1 | 319.1 | 2.91 | 7.35 |
| 59 | EXAMPLE 1 | 5.1 | 101.4 | 2.44 | 6.24 |

Inventive EXAMPLES 62 and 63 show that the swelling ratio of SAP, produced by the incorporation of about 5% of PAA (part of the product stream; from degraded SAP) into virgin SAP was about the same as the swelling ratio of virgin SAP (comparative EXAMPLE 60).

Example 60—Comparative 0.5 g to 1 g of dry and unground gel, prepared as in EXAMPLE 56, were selected, weighted accurately, and placed in a glass jar with approximately 200 mL of 0.9 wt % NaCl aqueous solution. The jar was allowed to stand without agitation for 3 days. Then, the free liquid was decanted and the swollen gel in the jar was re-weighted. The swelling ratio, in g/g, was calculated as the (weight of swollen gel−weight of dry gel)/weight of dry gel, and measured as 42.0 g/g.

Example 61—Comparative 0.5 g to 1 g of dry and unground gel, prepared as in EXAMPLE 57, were selected, weighted accurately, and placed in a glass jar with approximately 200 mL of 0.9 wt % NaCl aqueous solution. The jar was allowed to stand without agitation for 3 days. Then, the free liquid was decanted and the swollen gel in the jar was re-weighted. The swelling ratio, in g/g, was calculated as the (weight of swollen gel−weight of dry gel)/weight of dry gel, and measured as 55.3 g/g.

Example 62

0.5 g to 1 g of dry and unground gel, prepared as in EXAMPLE 58, were selected, weighted accurately, and placed in a glass jar with approximately 200 mL of 0.9 wt % NaCl aqueous solution. The jar was allowed to stand without agitation for 3 days. Then, the free liquid was decanted and the swollen gel in the jar was re-weighted. The swelling ratio, in g/g, was calculated as the (weight of swollen gel−weight of dry gel)/weight of dry gel, and measured as 40.0 g/g.

Example 63

0.5 g to 1 g of dry and unground gel, prepared as in EXAMPLE 59, were selected, weighted accurately, and placed in a glass jar with approximately 200 mL of 0.9 wt % NaCl aqueous solution. The jar was allowed to stand without agitation for 3 days. Then, the free liquid was decanted and the swollen gel in the jar was re-weighted. The swelling ratio, in g/g, was calculated as the (weight of swollen gel−weight of dry gel)/weight of dry gel, and measured as 38.3 g/g.

VIII Methods

SAP "GIC 31187" Preparation

Deionized water with resistance >5 MΩ·cm at 25° C., and ice made from the deionized water are used. A sample of about 100 g of the ice is melted in a 250 mL glass beaker (VWR International Ltd, Leicestershire, UK; part #LENZ07001049) and the conductivity is measured (e.g. via COND 70 INSTRUMENT without CELL, #50010522, equipped with Cell VPT51-01 C=0.1 from XS Instruments (Carpi MO, Italy) or via LF 320/Set, #300243 equipped with TetraCon 325 from WTW (Xylem Inc., Rye Brook, N.Y., USA)) as <1.6 μS/cm at 0° C.

A 20 L resin kettle (equipped with a four-necked glass cover closed with septa, suited for the introduction of a thermometer and syringe needles) is charged with about 8713.2 g of ice prepared as described above. A magnetic stirrer, capable of mixing the whole content (when liquid), is added and stirring is started (e.g. elliptic magnetic stir bar from VWR, part #442-0507). Stirring can take place at 250-600 rpm. 315.6 g of deionized water is taken to dissolve 33.52 g of "PEG700-DA" (e.g. poly(ethylene glycol)-diacrylate with number average molecular weight of about 700 g/mol, from Sigma-Aldrich, CAS #26570-48-9) in a 500 mL glass beaker. The glass beaker with the "PEG700-DA" solution is covered with parafilm and set aside. 250.0 g of deionized water is used to dissolve 5.175 g of "KPS" (potassium persulfate from Sigma-Aldrich, CAS #7727-21-1) in a 500 mL glass beaker. To this solution, about 0.208 g of 1 wt % aqueous solution of hydrogen peroxide (prepared by dilution with deionized water of 30 wt % aqueous hydrogen peroxide solution obtained from Sigma-Aldrich, CAS #7722-84-1) are added. The so-obtained "KPS" solution is closed and set aside. This solution must be used within 6 h of preparation. 50.0 g of deionized water are used to dissolve 1.128 g of ascorbic acid (from Sigma-Aldrich, CAS #50-81-7) in a 100 mL glass vial with a plastic cap. The solution "ascorbic acid" is closed and set aside. 4599.600 g of glacial acrylic acid (GAA, CAS #79-10-7; Acrylic Acid for synthesis, from Merck, #800181) are added to the ice in the resin kettle while stirring is continued. A thermometer is introduced into the resin kettle and in total 3472.600 g of 50 wt % NaOH solution (for analysis, from Merck, #158793, CAS #1310-73-2) and about 250.0 g of ice (prepared from de-ionized water) are added subsequently in portions such that the temperature is in the range of about 15-30° C. The mixture is continuously stirred. The "PEG700-DA" solution is added to the mixture of acrylic acid (AA), NaOH solution, and ice at a temperature of about 15-30° C., while stirring is continued. The vessel that contained the "PEG700-DA" solution is washed twice with deionized water in an amount of about 3% of the "PEG700-DA" solution volume per wash. The wash water of both washing steps is added to the stirred mixture. Deionized water (the remaining amount required to achieve the total amount of (ice+water) of 11887.47 g) is added to the stirred mixture, e.g. ca. 2308.67 g of deionized water. Then, the resin kettle is closed, and a pressure relief is provided e.g. by puncturing two syringe needles through the septa. The solution is then purged vigorously with argon via an injection needle (stainless steel 304 syringe, 36 in. long, size 16 gauge from Sigma-Aldrich, part #Z152404-1EA) at about 0.4 bar while stirring at about 250-600 rpm. The argon stream is placed close to the stirrer for efficient and fast removal of dissolved oxygen. After about minimum 1 h and maximum 2 h of argon purging and stirring, the "ascorbic acid" solution is added to the reaction mixture at a temperature of about 20-25° C. via a syringe while stirring and argon purging is continued. Within 1 min, the "KPS" solution is also added via funnel through one of the 4 necks in the glass cover, which is quickly covered after the addition of "KPS" is completed. After the initiator solutions ("ascorbic acid" and "KPS" solutions) are mixed with the reaction mixture, stirring and argon purging is continued but the purging needle is moved above the reaction mixture and temperature is recorded. As the polymerization starts, indicated by temperature rise in small steps, and more specifically after the gel point, characterized by sudden increase in viscosity, stirring is stopped. The temperature is monitored; typically, it rises from about 23° C. to about 70-95° C. within 60 min. Once the temperature reaches a maximum (the reaction mixture can reach for example up to about 105° C.) and starts dropping, the resin kettle is transferred into a circulation oven (Binder FED 720) and kept at about 60° C. for about 20 h.

After the polymerization completion time in the circulation oven, the latter is switched off and the resin kettle is allowed to cool down to about 20° C. to 40° C. while remaining in the oven. After that, the gel is removed and broken manually or cut with scissors into smaller pieces. The gel is ground with a grinder (X70G from Scharfen with Unger R70 plate system: 3 pre-cutter kidney plates with straight holes at 17 mm diameter), put onto perforated stainless steel dishes (hole diameter 4.8 mm, 50 cm×50 cm, 0.55 mm caliper, 50% open area, from RS; max. height of gel before drying: about 3 cm) and transferred into a circulation oven (e.g. Binder FED 720) equipped with a condensate trap from DAMM (condensation via cooling below dew point via heat exchanger) to dry the circulation air, cooled to 5° C. via a thermostat (Julabo FP 50)) at about 120° C. for about 20 h. The dried gel is then ground using a centrifuge mill (e.g. Retsch ZM 200 with vibratory feeder DR 100 (setting 50-60), interchangeable sieve with 1.5 mm opening settings, rotary speed 8000 rpm). The milled polymer is then sieved via a sieving machine (e.g. AS 400 control from Retsch with sieves DIN/ISO 3310-1 of 150 μm and 710 μm at about 250 rpm for about for 10 min) to a sieve cut which contains >90 wt % of the materials between 150 and 850 μm to obtain the Base Polymer "SK-002-A". The particles passing through the 150 μm sieve were collected under the name "RD 5717". The hereto described procedure is repeated two more times for stockpiling of SAP particles with cut 150-710 μm under the names "SK-002-E" and "SK-002-K", respectively. The corresponding cuts below 150 μm were collected as described for "SK-002-A" and under the names "GIC 31749" and "GIC 30266", respectively. To make the "GIC 31187" material, the materials "RD 5717", "GIC 31749", and "GIC 30266", all with particle size under 150 μm, were combined together and sieved again, as described above, but with sieves DIN/ISO 3310-1 with mesh sizes 63 μm and 150 μm, respectively.

SAP "GIC 31187" Properties

The so obtained SAP material was analyzed for capacity, moisture, and extractable polymer using the Centrifuge Retention Capacity (CRC) test method (EDANA method WSP 241.2.R3), moisture test method (EDANA method WSP 230.2.R3), and extractable polymer test method (EDANA method WSP 270.2.R3), respectively. The results were as follows: CRC=50.3 g/g; Moisture=0.3 wt %; and Extractable Polymer=15.03 wt %.

SAP "STC 16133" Properties

The SAP "STC 16133" material was analyzed for capacity, moisture, and extractable polymer per the methods mentioned above and the results were as follows: CRC=28 g/g; Moisture=0.8 wt %; and Extractable Polymer=9.2 wt %.

UV Total Energy Calculations

The UV total energy is the electric energy that is supplied to the UV unit, and is based on the voltage and amperage of the UV unit, and the residence time of the feed stream. If the voltage of the UV unit is 200 V and the amperage is 16 A, then the power of the UV unit is 3200 W. The UV total energy per unit mass of SAP is calculated based on the UV total power and the amount of SAP that is in the feed stream covering the whole length of the UV lamp. If the flow system tube has a diameter of 0.368 cm then, the number of flow system tubes that fit in the 15 cm length of the UV lamp is 40. If the flowrate of the feed stream in each tube is 5 mL/min and the SAP concentration is 2.5 wt %, then the UV total energy per unit mass of SAP is calculated as 3200 (J/s)×60 (s)/(40×5 (mL feed)×0.025 (g SAP/g feed)×1 (g feed/mL feed))=38.4 MJ/kg SAP, assuming the density of the feed stream is 1 g/mL.

UV Irradiation Energy Calculations

The UV irradiation energy (or simply, UV energy) is the UV energy dissipated in the feed stream, is based on the total energy density of the lamp and is calculated as shown in the example below (well known to those skilled in the art). The total energy density was measured with the UV PowerMAP® #20082105 A/B/C/V (EIT, Inc., Sterling, Va.) running under the UV lamp at various speeds. For example, at 5.6 m/min speed the energy densities were: UVA 488 mJ/cm$^2$, UVB 466 mJ/cm$^2$, and UVV 102 mJ/cm$^2$, yielding a total energy density of 1,056 mJ/cm$^2$. The energy density of UVV is neglected in these calculations. Similarly, at 11.2 m/min speed, the respective energy densities were: 249, 238, and 52 mJ/cm$^2$, and the total energy density was 539 mJ/cm$^2$. Extrapolation is used for speeds outside the above range of speeds, and interpolation is used for speeds inside the above range of speeds.

In the example used in the UV Total Energy Calculations above, the flowrate of the feed stream through the 0.368 cm diameter tube was 5 mL/min. Therefore, the average linear speed of the feed stream is calculated as 5 (cm$^3$/min)/((π× (0.368 cm)$^2$/4)×100)=0.47 m/min. This speed is outside the range measured above, and thus we did an extrapolation to calculate the total energy density at 0.47 m/min as 12,565 mJ/cm$^2$. The UV irradiation energy per unit mass of SAP is then calculated as: 12.565 (J/s·cm$^2$)×0.368 (cm)×15 (cm)/ (0.025 (g SAP/g feed)×π×((0.368$^2$ (cm$^2$))/4)×15 cm×1 g feed/cm$^3$)=1.7 MJ/kg SAP.

Note that in the examples above the UV total energy is 38.4 MJ/kg SAP and the corresponding UV irradiation energy is 1.7 MJ/kg SAP. These UV energy values indicate that the energy efficiency of the UV unit is 1.7/38.4=4.4%.

Molecular Weight Distribution (MWD) Analysis

It is done using the Tetradetection Gel Permeation Chromatography (GPC-T; Jordi Labs; Mansfield, Mass.) technique, as it is well known to those skilled in the art. The technique uses a GPC column, refractive index (RI) detector, right angle light scattering (RALS) detector, and viscometry (DP) detector. Approximately 50 mg of a sample are diluted into 2 mL of 0.1M NaNO3 with 0.01M Na$_2$HPO$_4$ with gentle agitation yielding transparent solutions. These solutions are injected without further processing. The instrument is calibrated with a Pullulan standard ($M_w$=61,330 Da), and its performance is verified with a Dextran standard ($M_w$=68, 162 Da).

The foregoing description is given for clearness of understanding only, and no unnecessary limitations should be understood therefrom, as modifications within the scope of the invention may be apparent to those having ordinary skill in the art.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, comprising any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for degrading a superabsorbent polymer (SAP) to poly(acrylic acid) (PAA) comprising flowing a feed stream comprising said SAP into a UV irradiation zone, irradiating said feed stream with UV, and producing a product stream comprising said PAA at the end of said irradiation zone; wherein said feed stream comprises said SAP at a concentration greater than about 1 wt %; wherein said feed stream has a residence time in said UV irradiation zone of less than about 120 s; and wherein said UV used to convert SAP to PAA requires a UV total energy of less than about 50 MJ/kg SAP.

2. The method of claim 1, wherein said residence time is less than about 60 s.

3. The method of claim 1, wherein said UV total energy is less than about 16 MJ/kg SAP.

4. The method of claim 1, wherein said feed stream comprises SAP and water.

5. The method of claim 1, wherein said feed stream comprises SAP and hydrogen peroxide.

6. The method of claim 1, wherein said SAP has degree of neutralization (DN) greater than about 50%.

7. The method of claim 1, wherein said SAP has DN between about 65% and about 75%.

8. The method of claim 1, wherein said feed stream has a viscosity; wherein said product stream has a viscosity; wherein the ratio of the viscosity of the product stream to the viscosity of the feed stream is the viscosity ratio; and wherein the negative logarithm of said viscosity ratio is less than about 6.

9. The method of claim 1, wherein said feed stream has a viscosity; wherein said product stream has a viscosity; wherein the ratio of the viscosity of the product stream to the viscosity of the feed stream is the viscosity ratio; and wherein the negative logarithm of said viscosity ratio is less than about 4.

10. The method of claim 1, wherein said feed stream has a viscosity; wherein said product stream has a viscosity; wherein the ratio of the viscosity of the product stream to the viscosity of the feed stream is the viscosity ratio; and wherein the negative logarithm of said viscosity ratio is less than about 2.

11. The method of claim 1, wherein said PAA has a weight-average molecular weight less than about 2,000,000 g/mol.

12. The method of claim 1, wherein said PAA has a weight-average molecular weight less than about 1,000,000 g/mol.

13. The method of claim 1, wherein said PAA has a polydispersity index (PDI) less than about 4.

14. The method of claim 1, wherein said PAA is used to produce a recycled SAP; said SAP comprises PAA at a concentration; and wherein said PAA concentration is less than about 30%.

15. The method of claim 1, wherein said PAA is used to produce a recycled SAP; wherein said recycled SAP has an amount of extractables; and wherein said amount of extractables is less than about 15%.

16. The method of claim 1, wherein said PAA is used to produce a recycled SAP; wherein said recycled SAP has a swelling ratio; and wherein said swelling ratio is greater than about 45 g/g.

17. A method for degrading a superabsorbent polymer (SAP) to poly(acrylic acid) (PAA) comprising flowing a feed stream comprising said SAP into a UV irradiation zone, irradiating said feed stream with UV, and producing a product stream comprising PAA at the end of said UV irradiation zone; wherein said feed stream comprises water and SAP at a concentration greater than about 1 wt %; wherein said feed stream has a residence time in said UV irradiation zone of less than about 120 s; wherein said UV used to convert SAP to PAA requires a UV total energy of less than about 16 MJ/kg SAP; and wherein said PAA has a weight-average molecular weight less than about 1,000,000 g/mol.

18. A method for degrading a superabsorbent polymer (SAP) to poly(acrylic acid) (PAA) comprising flowing a feed stream comprising said SAP into a UV irradiation zone, irradiating said feed stream with UV, and producing a product stream comprising PAA at the end of said UV irradiation zone; wherein said feed stream comprises water and SAP at a concentration greater than about 5 wt %; wherein said feed stream has a residence time in said UV irradiation zone of less than about 120 s; wherein said UV used to convert SAP to PAA requires a UV total energy of less than about 16 MJ/kg SAP; and wherein said PAA has a weight-average molecular weight less than about 1,000,000 g/mol.

19. The method of claim 18, wherein said feed stream has a viscosity; wherein said product stream has a viscosity; wherein the ratio of the viscosity of the product stream to the viscosity of the feed stream is the viscosity ratio; and wherein the negative logarithm of said viscosity ratio is less than about 4.

20. The method of claim 18, wherein said SAP has DN between about 65% and about 75%.

21. The method of claim 18, wherein said feed stream comprises SAP and hydrogen peroxide.

* * * * *